INVENTOR.
WILLIAM R. BROWNLEE
BY Arthur H. Swanson
ATTORNEY.

June 2, 1959  W. R. BROWNLEE  2,889,466
CONTROLLING APPARATUS
Filed Sept. 17, 1957
3 Sheets-Sheet 2
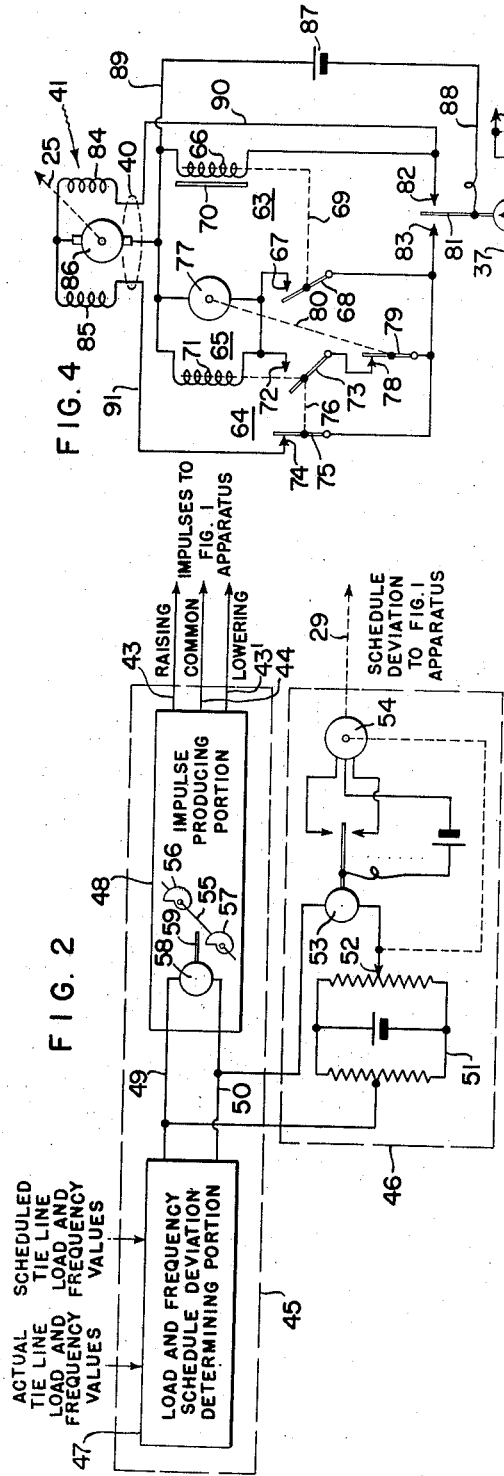
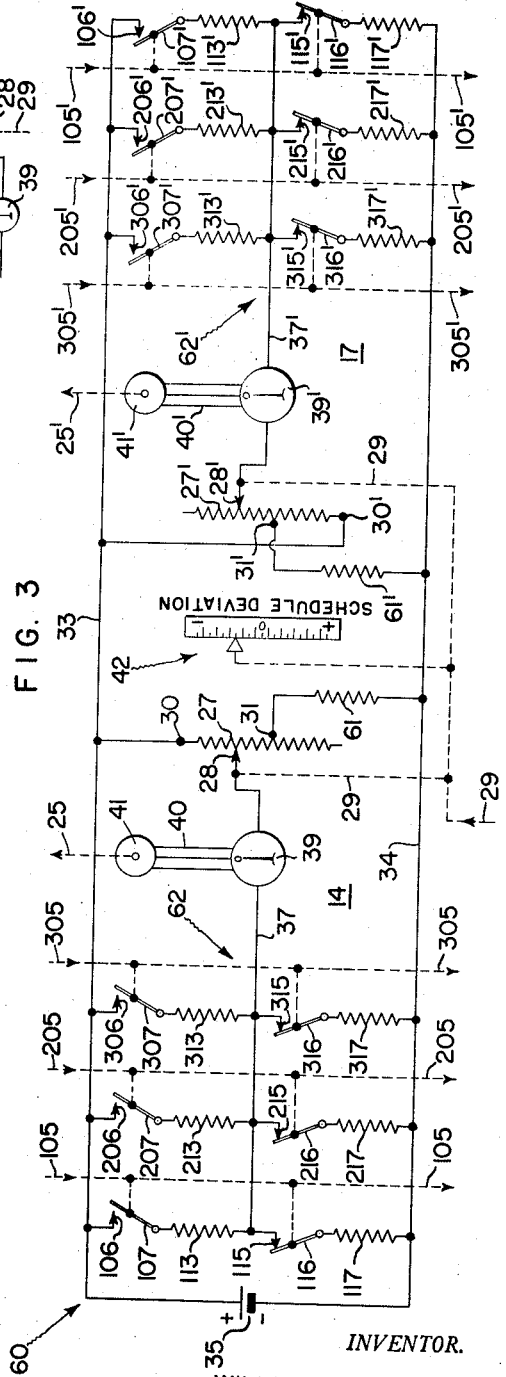
INVENTOR.
WILLIAM R. BROWNLEE
BY Arthur H. Swanson
ATTORNEY.

June 2, 1959

W. R. BROWNLEE 2,889,466

CONTROLLING APPARATUS

Filed Sept. 17, 1957

INVENTOR.
WILLIAM R. BROWNLEE
BY Arthur N. Swanson
ATTORNEY.

United States Patent Office 2,889,466
Patented June 2, 1959

2,889,466

CONTROLLING APPARATUS

William R. Brownlee, Birmingham, Ala.

Application September 17, 1957, Serial No. 684,498

33 Claims. (Cl. 307—57)

The present invention relates generally to apparatus for use in assigning the loads to the interconnected generating plants of an electric power generating and distributing system in such a way that the scheduled system requirements are met in the most economical manner. Specifically, the invention relates to apparatus of the foregoing type for so controlling the outputs of the system plants that the system generation is divided among the plants in the manner necessary to produce the most economical combination of plant loadings, and the most economical operation of the system.

More specifically, the present invention relates to controlling apparatus of the stated type for assigning generation control impulses to the system plants on the basis of the incremental costs of delivered energy for the plants to the end of maintaining an optimum economic division of the system generation among the plants.

A general object of the present invention is to provide new and improved apparatus for use in assigning the loads to the interconnected generating plants of an electric power generating and distributing system in accordance with the incremental costs of delivered energy for the plants, to the end of meeting the scheduled requirements of the system in the most economical manner.

A specific object of the invention is to provide novel apparatus of the type just specified which, in controlling the outputs of the system plants to the end of fulfilling the scheduled system requirements, divides the total system generation among the plants as necessary to secure the most economical combination of plant loadings, and the most economical operation of the system.

A more specific object of the invention is to provide novel controlling apparatus of the foregoing type which controls the plant outputs to meet the system requirements in the most economical manner by assigning and applying plant generation changing control impulses to the plants in accordance with both the incremental costs of delivered energy for the plants and the extent of any deviation of the system operating conditions from scheduled values therefor.

A still more specific object of the invention is to provide novel control impulse assigning apparatus as just specified wherein the number of plants selected to receive the control impulses is a function of the extent of deviation between existing and scheduled values of the system conditions, and hence is a function of the amount of load correction required, while the order of selection of these plants is made in accordance with their incremental costs of delivered energy as necessary to provide economic loading of the plants and an optimum economic division of the system generation among the plants.

An even more specific object of the invention is to provide novel controlling and control impulse assigning apparatus as specified above for initially selecting the plant or plants with the lowest incremental delivered energy cost to receive generation raising impulses upon the development of a need for an increase in the total system generation, and for initially selecting the plant or plants with the highest incremental delivered energy cost to receive generation lowering impulses upon the development of a need for a decrease in the total system generation.

Another specific object of the invention is to provide novel apparatus of the foregoing type which is operative to maintain an optimum economic plant load division notwithstanding variations in the incremental delivered energy costs for one or more of the plants.

Still another specific object of the invention is to provide novel apparatus of the above type which operates with a high degree of stability, and without hunting, notwithstanding the simultaneous existence of substantially equal incremental delivered energy costs for two or more of the system plants.

A still further specific object of the present invention is to provide novel apparatus as specified above which, while operating to fulfill the foregoing objects, prevents a plant which has been loaded to its predetermined maximum or minimum value from receiving further raising or lowering impulses, respectively, but does not prevent such a plant from receiving impulses of the character to shift its generation in the direction away from the extreme value.

Yet another specific object of the invention is to provide novel apparatus of the foregoing type wherein the application of control impulses to certain plants is prevented in those instances where such application would result in tie line loading in excess of predetermined, established limits.

It has been recognized in the past that to keep a power system operating in the most economical manner at all times, with a minimum cost for the total delivered power or energy in the system, requires that there be maintained at all times an optimum economic division of the system generation among the system plants. In other words, economic system operation, and the meeting of the scheduled requirements of the system in the most economical manner, require that the generation needed to meet these requirments be apportioned or divided among the plants as necessary to secure the most economical combination of plant loadings for the existing conditions. This in turn requires that the changes in plant generation needed to cause the system to meet its scheduled requirements be assigned and made in accordance with the incremental costs of delivered energy for the plants.

In view of this, it has been proposed to provide computing apparatus for computing a measure of the incremental delivered energy costs for the plants of a system, this data being intended for use in assigning the plant loads to the end of obtaining economical system operation. One form of such apparatus is arranged to exhibit the computed data in the form of indications representing the existing plant incremental delivered energy costs. An example of this form of computer is the well-known so-called "Early Bird" computer of the Southern Company, which is described, for example, in the article entitled "Central Power Coordination Control for Maximum System Economy," by E. D. Early, which appeared on pages 96 through 98 of the December 1953, issue of "Electric Light and Power."

Another form of such apparatus is that described and claimed in my copending application Serial No. 632,917, filed on January 7, 1957. This apparatus provides electrical signals which are functions of the relative incremental delivered energy costs for the system plants.

Accordingly, it is an object of the present invention to provide novel automatic plant generation controlling apparatus as specified hereinbefore which permits computing apparatus of the kind described above to be used in the automatic assignment and control of plant generation as necessary to secure automatically the most economical operation of the system at all times. To this end, it is an object of the invention to provide such automatic plant generation controlling apparatus which is arranged to utilize the plant incremental delivered energy cost data provided by such computing aparatus as the basis for providing an optimum economic division of the system load among the plants, to the end of causing the scheduled system requirements to be met at all times in the most economical manner.

To the end of fulfilling the foregoing and other desirable objects of the present invention, apparatus provided in accordance with the invention responds to any deviation between the existing and scheduled values of the system tie line loading and/or frequency to produce a corrective action commensurate with the extent and direction of the deviation, and hence with the amount and direction of the change in the system generation required to eliminate the deviation. This corrective action consists of the selection of one or more of the system plants to have assigned thereto, and to receive, generation controlling impulses, and is effected by producing, upon the occurrence of a schedule deviation, a reference signal which increases in value, with a sense determined by the direction of the deviation, until the necessary corrective action is established. Concurrently, the apparatus continuously compares the value of the reference signal to the values of cost signals representative of the existing incremental delivered energy costs for the several system plants. On the basis of these comparisons, the apparatus selects one or more of the system plants to receive generation raising or lowering control impulses produced by means responsive to the deviation.

When the number of plants so selected becomes commensurate with the extent of the deviation and the required change in the system generation, the value of the reference signal is no longer caused to increase. Thus, the number of plants selected to receive the control impulses in the foregoing manner is, in each case, a function of the extent of the deviation. Whether the plants are selected to receive raising or lowering impulses depends upon the sense of the reference signal, and hence upon the direction of the deviation.

In the making of the foregoing comparisons and selections, the order of selection is dependent upon the relative values of the cost signals and the reference signal, and hence upon the incremental delivered energy costs for the plants. Thus, the plants are selected for receiving the control impulses on an economic basis which results in an optimum economic division of the system load among the plants.

In the presence of a deviation requiring, for its elimination, an increase in the total system generation, the comparison effected between the values of the reference and cost signals results in the selection, to receive raising impulses, of the plant having the lowest incremental delivered energy cost, the two lower cost plants, the three lower cost plants, etc., up to all of the plants if necessitated by the extent of the deviation. Similarly, a deviation requiring a decrease in total system generation causes the highest cost plant, the two higher cost plants, the three higher cost plants, etc., to be selected to receive lowering impulses. In each case, the plants are selected in the order of their existing incremental delivered energy costs, the number of plants so selected being dependent upon the extent of the deviation.

The appropriate control impulses are supplied by the apparatus, as by telemetering, to the corresponding plants selected in the foregoing manner, with the result that the generation of these plants is changed in the required direction. This causes the total system generation to be changed to reduce and eliminate the deviation responsible for the corrective action, and the accompanying reduction in the value of the reference signal prevents the previously selected plants from receiving further control impulses until again selected as a result of a subsequent deviation.

In accordance with one aspect of the invention, the simultaneous existence of substantially equal incremental delivered energy costs for two or more of the system plants is prevented from producing a hunting action by establishing a hold-out period during which the removal of plants from a group receiving lowering or raising impulses is prevented so as to prevent oscillatory changes in the reference signal which would tend to produce such a hunting condition.

In accordance with another aspect of the invention, a plant whose generation has reached a predetermined upper limit is prevented from receiving further raising impulses, and the plant with the next lowest incremental cost of delivered energy is then automatically selected to take the place of the first mentioned plant with respect to receiving raising impulses. However, a plant so prevented from being supplied with further raising impulses is still eligible to receive lowering impulses when and if selected. The same applies, with respect to impulses of the opposite sense, to a plant whose generation has reached a predetermined lower limit.

In accordance with still another aspect of the invention, the control of the generation of the plants is interlocked to prevent one or more plants from receiving the control impulses when such receipt would result in the loading of one or more tie lines to values in excess of predetermined, established limits.

A better understanding of the present invention may be had from the following detailed description of apparatus embodying the invention, which description is to be read in connection with the accompanying drawings, wherein:

Fig. 2 is a block type circuit diagram of a typical source of deviation data and control impulses for use with the apparatus of Fig. 1;

Fig. 3 is a schematic circuit diagram of a modification according to the invention of the reference signal controlling section of the Fig. 1 apparatus;

Fig. 4 is a schematic circuit diagram of an anti-hunting modification according to the invention of a part of the apparatus of Fig. 1 or Fig. 3.

DESCRIPTION OF THE FIG. 1 APPARATUS

The economic generation control impulse assigning apparatus embodiment of the invention illustrated in Fig. 1 has been shown as an arrangement for controlling, on economic basis, the generation or output of three interconnected generating plants, not shown, referred to hereinafter as Plant 1, Plant 2, and Plant 3. For purposes of description and explanation, it is assumed herein that these three plants are the interconnected generating plants of a typical electric power generating and distributing system, not shown, and that the Fig. 1 apparatus controls the generation in this system so that the latter operates to meet its scheduled load and/or frequency requirements in the most economical manner. While such a system might well, in practice, include additional generating plants which, for one or another reason, are not subject to the control effected by the Fig. 1 apparatus, it is assumed herein for simplicity of description and explanation that the system includes no generating plants other than the three plants which are controlled by the Fig. 1 apparatus.

Figure 1:
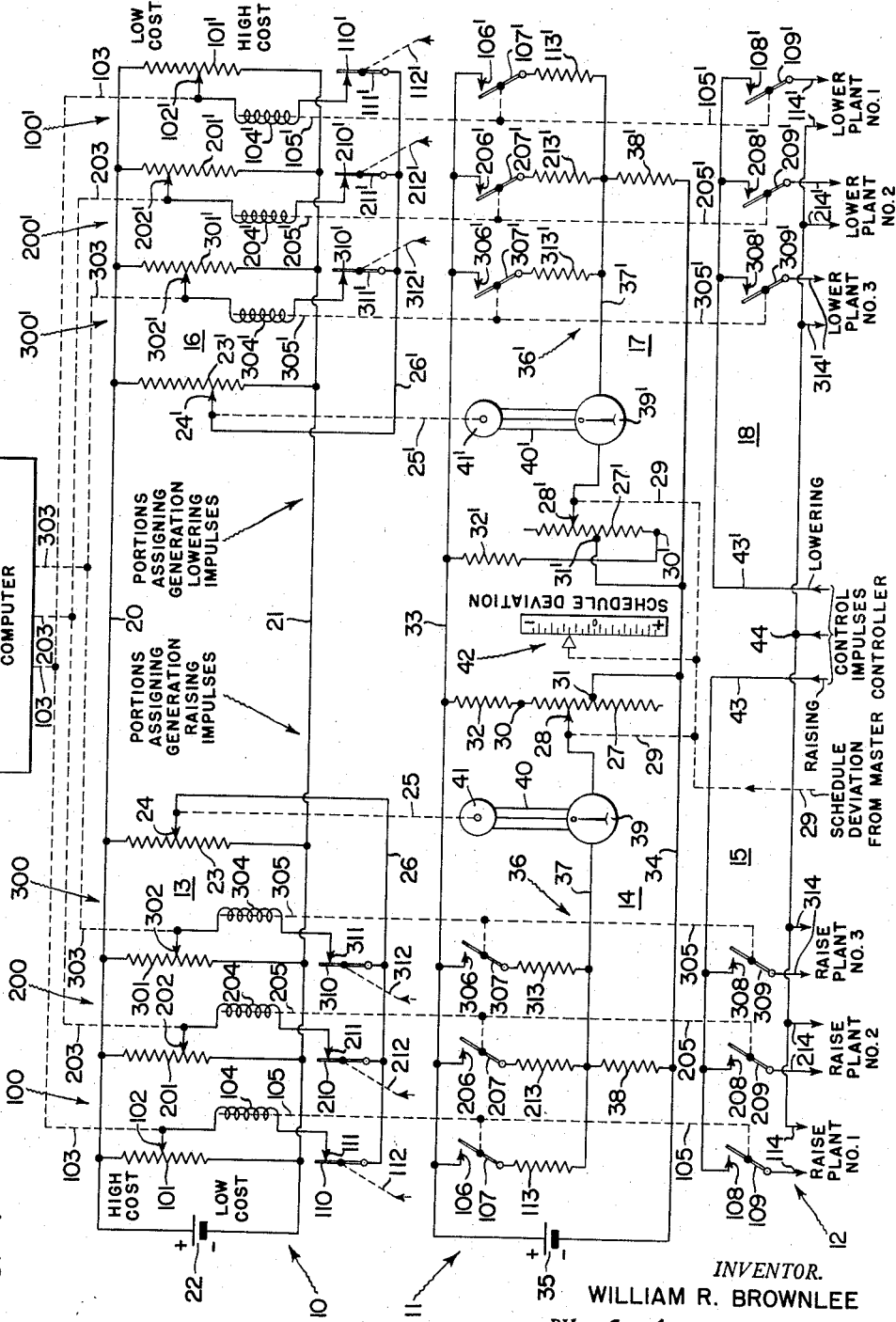
Fig. 1 is a schematic circuit diagram of economic generation control impulse assigning apparatus embodying the present invention.

Although the apparatus embodiment of the invention illustrated in Fig. 1 has been shown, for simplicity of description and explanation, as an arrangement for controlling three generating plants, it is to be noted that apparatus of the type shown in Fig. 1 could well be constructed according to the invention to control any number of plants, and could be used, therefore, to control the generation in a system having any number of plants. However, it is believed that the illustrated embodiment of Fig. 1 with its provisions for controlling three generating plants serves adequately to illustrate the principles of the present invention.

The stated purpose of the Fig. 1 apparatus is to assign or supply to the three system generating plants, in accordance with their incremental costs of delivered energy, plant generation, load, or output controlling impulses, referred to hereinafter simply as control impulses, as necessary to cause the plants to share the total system generation in the most economical manner, and hence to fulfill the scheduled system tie line load and/or frequency requirements with a minimum total generation cost. To this end, the Fig. 1 apparatus includes an economic plant selecting section 10, a schedule deviation-responsive reference signal controlling section 11, and a control impulse applying or connecting section 12. Each of these three sections has a first or raising impulse half or portion 13, 14, and 15, respectively, which is shown at the left-hand side of the drawing and which is concerned with assigning generation raising control impulses, or simply raising impulses, to the plants. Similarly, each of the sections 10, 11, and 12 has a second or lowering impulse half or portion 16, 17, and 18, respectively, which is shown at the right-hand side of the drawing and which is concerned with assigning generation lowering control impulses, or simply lowering impulses, to the plants. In each of the sections 10, 11, and 12, the raising and lowering portions of the sections are identical to each other, except for being concerned with control impulses of opposite sense.

For the purpose of facilitating the following description of the disclosed apparatus, the reference numbers employed to denote components individual to the control of Plant 1 are in the 100 series, those for Plant 2 are in the 200 series, and so on. In each case, all components serving the same purpose but with respect to their corresponding plants have been designated by the same basic reference number, but in the appropriate hundreds series corresponding to the plant served. Further, each of the components of the lowering portions 16, 17, and 18 has been designated by the same reference number as the corresponding component in the corresponding one of the raising portions 13, 14, and 15, but with a prime symbol (′) added.

The raising portions 13, 14, and 15 collectively include three separate groups of components 100, 200, and 300, each group being individual to a corresponding one of the Plants 1, 2, and 3 and being concerned with the selection and control of the corresponding plant with respect to raising impulses. Similarly, the lowering portions 16, 17, and 18 collectively include three separate groups of components 100′, 200′, and 300′, each of these groups being individual to a corresponding one of the Plants 1, 2, and 3 with respect to lowering the generation of the corresponding plant. Thus, increases in the generation of Plant 1 are effected through the action of the components of group 100, decreases in the generation of Plant 2 are effected through the action of the components of group 200′, and so on. Accordingly, raising or lowering impulses can be and are assigned and routed or applied to any one or combination of the Plants 1, 2 and 3, depending upon the need for a system generation change and upon the economics involved.

Briefly describing the sections 10, 11, and 12 and their cooperation in the Fig. 1 apparatus, it is noted that the economic plant selecting section 10 receives plant incremental delivered energy cost information in the form of slide wire contact positioning adjustments which are representative of the existing incremental cost of delivered energy for each of Plants 1, 2, and 3. These adjustments are supplied to the section 10 by and from a suitable plant incremental cost of delivered energy computer 19, to be described hereinafter.

The left-hand or raising portion 13 of the section 10 transforms the above-mentioned cost value adjustments into corresponding cost signals for each plant, and continuously compares the values of these signals to the value of a raising reference signal indicative of any negative schedule deviation, i.e., any schedule deviation requiring for its elimination an increase in the system generation. On the basis of these economic comparisons, the portion 13 selects one or more of the Plants 1, 2, and 3 to receive raising impulses by actuating corresponding contacts included in the raising portion 15 of the control impulse applying or connecting section 12. The latter receives a supply of such impulses from other apparatus, such as that of Fig. 2 to be described hereinafter.

Similarly, the right-hand or lowering portion 16 of the section 10 continuously compares the values of cost signals produced in the portion 16 to the value of a lowering reference signal indicative of any positive schedule deviation, i.e., any schedule deviation requiring for its elimination a decrease in the system generation. On the basis of these economic comparisons, the portion 16 selects one or more of the Plants 1, 2, and 3 to receive lowering impulses by actuating corresponding contacts included in the lowering portion 18 of the section 12.

The values of the aforementioned raising and lowering reference signals are determined and adjusted in accordance with the system schedule deviation by the reference signal controlling section 11, which is supplied, by other apparatus, such as that of Fig. 2 to be described hereinafter, with data in the form of slide wire contact positioning adjustments representative of the magnitude and direction of any schedule deviation. Such deviation is proportional to any departure in the system tie line loads and/or frequency from predetermined or scheduled values therefor. The raising portion 14 of the section 11 controls the value of the raising reference signal in the portion 13 so that, in the presence of a negative schedule deviation, said value increases progressively until the portions 13 and 15 have selected and assigned raising impulses to a number of the Plants 1, 2, and 3 commensurate with the magnitude of the negative deviation.

Similarly, the lowering portion 17 of the section 11 controls the value of the lowering reference signal in the portion 16 so that a positive schedule deviation causes said value to increase progressively until the portions 16 and 18 have selected and assigned lowering impulses to a number of the Plants 1, 2, and 3 commensurate with the magnitude of the positive deviation.

For each of the portions 14 and 17, a suitable reduction in the magnitude of the respective deviation initiates a progressive reduction in the value of the corresponding reference signal which continues until the number of selected plants has been reduced to a value commensurate with the reduced magnitude of the deviation.

The general manner in which the sections 10, 11, and 12 of the Fig. 1 apparatus are constructed and arranged to cooperate to fulfill the objects of the present invention should be apparent from the foregoing brief description. The specific construction and operation of the sections 10, 11, and 12, and of the entire Fig. 1 apparatus, will now be described in detail.

*The portion 13 of the section 10*

The purpose of the economic plant selecting section 10 is to choose the number and order of selection of plants for connection by the section 12 to receive appropriate control impulses, the number of plants so chosen being a function of the schedule deviation, and the order of selection being based on the incremental cost of delivered energy for the plants so as to provide economical division of the system generation among the plants. To this end, the raising portion 13 of the section 10 includes plant incremental delivered energy cost slide wire resistors 101, 201, and 301 which are individual to the respective component groups 100, 200, and 300 for Plants 1, 2, and 3, respectively. The resistors 101, 201, and 301 are provided with respective adjustable contacts 102, 202, and 302. The resistors 101, 201, and 301 are all connected in parallel between, and are thus energized from, energizing conductors 20 and 21, which are adapted to be connected to a source of unidirectional voltage, such as a battery 22.

The resistor contacts 102, 202, and 302 are adjusted and positioned by the computer 19 through respective linkages 103, 203, and 303 in accordance with the incremental delivered energy costs, hereinafter referred to simply as costs, for the respective plants as determined by the computer 19. The apparatus is so arranged that each of the contacts 102, 202, and 302 is adjusted to assume a position adjacent to the lower end of its associated cost resistor when the cost for the corresponding plant is low, and is adjusted to assume a position adjacent to the upper end of its associated cost resistor when the cost for the corresponding plant is high.

Specifically, the lower the cost for a given plant, the closer the corresponding one of the cost resistor contacts 102, 202, and 302 will be positioned toward the lower end of the associated one of the cost resistors 101, 201, and 301. Conversely, the higher the cost for a given plant, the closer the corresponding cost resistor contact will be positioned toward the upper end of the associated cost resistor. The absolute cost value calibration for the positions of the three contacts 102, 202, and 302 along the corresponding resistors may be arbitrarily chosen as long as the relative positions of these three contacts are proportional at any time to the existing relative costs for the corresponding plants.

The computer 19 may well be of the form of the well-known "Early Bird" computer mentioned hereinbefore, in which case the linkages 103, 203, and 303 would be positioned in accordance with the plant cost indications provided by such a computer.

By virtue of the connection of the resistors 101, 201, and 301 between the energizing conductors 20 and 21, and of the foregoing positioning of the contacts 102, 202, and 302, the potential of each of these contacts with respect to the conductor 21 is proportional to the cost for the corresponding plant, and becomes more and more positive as the cost of the corresponding plant increases. Accordingly, there is produced between each of contacts 102, 202, and 302 and the conductor 21 a cost signal for the corresponding plant having a value which is proportional to the existing cost for that plant. Also, the relative values of these three cost signals and contact potentials are proportional at any time to the existing relative costs for the corresponding plants.

A reference slide wire resistor 23 having an adjustable contact 24 is also connected between the conductors 20 and 21. The contact 24 is positioned through a linkage 25 by the raising portion 14 of the reference signal controlling section 11 in accordance with any negative schedule deviation in a manner to be described hereinafter. It is sufficient to note for the present that the contact 24 is so adjusted by the linkage 25 that this contact is progressively moved upward along the resistor 23 as long as there exists a negative schedule deviation which is not accompanied or balanced by the selection of an appropriate number of plants to receive raising impulses. Consequently, the potential between the contact 24 and the conductor 21, and hence between a reference signal conductor 26, connected to the contact 24, and the conductor 21, becomes more and more positive as long as such an unbalanced deviation prevails. Accordingly, there is produced between the conductors 26 and 21 a raising reference signal which increases progressively in value as long as an unbalanced negative deviation exists.

In connection with the foregoing description as well as that to follow, it is noted that, in each case, the adjustable contacts of the several slide wire resistors may be arranged to be positioned only between predetermined limits of travel, corresponding either to desired limits of the values represented, or to actual physical limitations of the resistors. For example, upon a sustained unbalanced deviation, the contact 24 is desirably prevented from having further upward motion once a predetermined upper limit position is reached.

The value of each of the above-described cost signals is continuously compared to the value of the reference signal for the purpose of determining, in the presence of a negative schedule deviation, which and how many of the plants should be selected to receive raising impulses so as to eliminate the deviation. The criteria for such selection are that the number of plants so selected be proportional to the magnitude of the deviation, and that the lowest cost plant be loaded first, up to its predetermined maximum capacity, if required, followed by or together with the higher cost plants, if necessitated by the magnitude of the deviation.

The foregoing comparisons between the cost and reference signals are effected by means of voltage responsive polarized electromagnetic raising relays, one of which is included in each of the groups 100, 200, and 300 of the section 13 for each of Plants 1, 2, and 3. The raising relay for Plant 1 in the group 100 has an operating coil or winding 104 and a contact actuating linkage 105 which actuates two sets of normally open relay contacts, in the usual manner, to close or open each set of contacts as the relay is caused to pick up or drop out, respectively, as a result of the respective effective energization or deenergization of its coil 104. Reading from top to bottom along the linkage 105 in Fig. 1, these contacts include a set of deviation balancing contacts 106 and 107 located in the raising reference portion 14, and a set of impulse connecting or supplying contacts 108 and 109 located in the raising impulse applying portion 15.

The relay coil 104 is connected in series with high load limit or interlock switch contacts 110 and 111 between the cost contact 102 and the reference conductor 26, and is thus actually connected between the cost contact 102 and the reference contact 24. Accordingly, the relay coil 104 is responsive to the magnitude and polarity of the potential difference between the two resistor contacts 102 and 24. For the following description, it will be assumed that this relay is so polarized that the contacts 106—107 and 108—109 are not closed until and unless the potential of the lower end of the coil 104 and of the reference contact 24 becomes positive with respect to the upper end of the coil and of the cost contact 102 by a predetermined amount, herein referred to as the relay pick-up value. As a result, upon an upward movement of the reference contact 24, or a downward movement of the contact 102, the relay coil 104 is not effectively energized to close the contacts 106—107 and 108—109 until and unless the potential of the contact 24 rises above or exceeds the potential of the contact 102 by the pick-up value. Further, the relay remains in the picked up condition, and the relay contacts remain closed, as long as the foregoing potential difference exists and until the potential of the contact 24 drops below that of the contact 102. This and the following explanation neglect the operation of the high limit interlock contacts 110 and 111, which operation will be described hereinafter.

It is clear from the foregoing that the relay coil 104 compares the potential of the contact 24 to that of the contact 102, and hence compares the values of the reference signal and the Plant 1 cost signal, to determine on a cost basis whether or not the contacts 108—109 should be closed under the prevailing conditions, and hence whether or not Plant 1 should then be selected to receive raising impulses. If this comparison shows that the reference signal is larger than the cost signal for Plant 1 so as to make the lower end of the coil 104 sufficiently positive with respect to the upper end thereof, the resulting closure of the balancing contacts 106—107, accompanying the closure of the impulse supplying contacts 108—109, partially or fully balances the deviation and hence prevents or tends to prevent further increase in the value of the reference signal, depending upon the magnitude of the deviation. This action of the relay deviation balancing contacts will be described more fully hereinafter in connection with the description of the reference signal controlling section 11.

The circuit including the resistors 101 and 23 and the relay coil 104 can, for convenience, be considered to be a bridge circuit, wherein the relay coil is connected between the bridge output terminals, formed by the resistor contacts 102 and 24. Such a consideration makes it clear that, for a given cost position of the contact 102, the relay coil 104 will be energized by a bridge output of the correct polarity for closing the relay contacts only when the contact 24 rises above a corresponding position along its resistor 23.

Each of the raising relays of the groups 200 and 300 for the respective Plants 2 and 3 also includes a coil, a linkage, and two sets of contacts all arranged and connected as described above with respect to the relay for Plant 1. Accordingly, upon a progressive upward motion of the reference contact 24 and the corresponding progressive increase in the reference signal between the conductor 26 and the cost contacts 102, 202, and 302, the first relay to close its contacts and cause its plant to be connected by the portion 15 to receive raising impulses will be the relay whose associated cost contact is the closest to the bottom of its cost resistor, whose cost signal is thus the lowest in magnitude, and whose plant thus has the lowest cost among the three plants. If the magnitude of the deviation is such as to require more than one plant to receive raising impulses, as evidenced by the further progressive increase of the reference signal following the picking up of the first relay, the second relay to be picked up will be the one whose plant cost signal is the lower of the remaining two, and so on. Thus, the raising portion 13 of the selecting section 10 selects the plants in the order of their increasing incremental delivered energy costs in choosing which plants are to be connected by the section 15 to receive raising impulses, this order of selection resulting in an economical division of the system generation among the plants.

The purpose of the high limit interlock contacts 110—111 for Plant 1, as well as the similar contacts 210—211 for Plant 2 and 310—311 for Plant 3, is to prevent the corresponding plant from receiving raising impulses, and hence from having its generation increased, once this generation has reached a predetermined maximum value. To this end, the contacts 110—111, for example, are arranged to be actuated through a linkage 112 by means, not shown, which is responsive to the existing generation of Plant 1. Such means might well be a plant load recorder of the usual type having the contacts 110—111 as its adjustable high limit contacts.

In any event, the apparatus is so arranged that, when the application of raising impulses to Plant 1 results in the output or generation of this plant being raised to the set maximum value therefor, the linkage 112 opens the contacts 110—111 and thus disconnects the relay coil 104 from its energizing circuit. The result of this is that Plant 1 is then prevented from receiving further raising impulses and hence from having its output further increased, since the impulse connecting contacts 108 and 109 cannot be closed as long as the relay coil 104 is disconnected and hence deenergized. Such disconnection of the raising relay coil 104 does not, however, prevent Plant 1 from being supplied with lowering impulses by the portion 18 should this plant be selected by the portion 16 to have its generation lowered and hence to receive such lowering impulses.

As will be apparent from the detailed description of the portion 14 to be presented hereinafter, the opening of the balancing contacts 106—107 which accompanies the foregoing high limit disconnection of the relay coil 104 causes the lower cost one of the remaining two plants to take the place of Plant 1 for receiving further raising impulses if the latter are necessitated by the deviation. Briefly, such opening of the balancing contacts 106—107 in the presence of a continuing deviation removes the deviation balancing effect produced by the previous closure of these contacts, and hence results in the selection of another plant or plants to receive raising impulses as necessary to provide a sufficient deviation balancing action. Thus, plants reaching the upper limits of their generation are automatically prevented from receiving further raising impulses and are replaced for receiving such further impulses by the lower cost one of the remaining plants.

When the generation of a previously fully loaded plant is reduced to a value below the upper limit of such generation, the corresponding high limit contacts are reclosed through their linkage, whereby this plant is once more permitted to receive raising impulses when selected.

It is noted that, if desired, the D.C. energizing source 22, and/or the other D.C. energizing sources of the apparatus to be described hereinafter, can be replaced by a suitable A.C. energizing source or sources. If this is done, the various relays of the apparatus would then be of the phase sensitive type instead of the polarized type as described herein for use with the D.C. sources.

*The portion 16 of the section 10*

As was previously noted herein, the lowering portion 16 is essentially identical to the raising portion 13, as just described, except for being concerned with impulses of the opposite sense, and contains components and connections duplicating those of the portion 13. Specifically, the portion 16 includes plant cost slide wire resistors 101', 201', 301' and a reference slide wire resistor 23', all of which are connected in parallel between the energizing conductors 20 and 21. The cost contacts 102', 202', and 302' are adjusted and positioned by the respective linkages 103, 203, and 303 in correspondence with the adjustments and positions imparted by the three linkages to the corresponding cost contacts 102, 202, and 302. To this end, the contacts 102 and 102' are adjusted in unison, the contacts 202 and 202' are adjusted in unison, and so on. However, in the portion 16, the cost resistor contacts 102', 202', and 302' are caused to move toward the lower ends of their associated resistors for high plant costs, and to move toward the upper ends of their resistors for low plant costs. Thus, the higher the cost for a given plant, the closer the corresponding one of the cost contacts 102', 202', and 302' will be positioned toward the lower end of its associated cost resistor, and vice versa. This is the opposite of the direction of motion for the cost contacts 102, 202, and 302 of the raising portion 13, and results in the selection of the highest cost plant as the first one to receive lowering impulses, as is necessary for economic control.

The reference resistor contact 24' of the portion 16 is positioned through a linkage 25' by the lowering portion 17 of the section 11 in accordance with any positive schedule deviation, in the same manner as the contact 24 is positioned in the portion 13 in accordance with negative schedule deviation. Accordingly, the potential of the conductor 26', connected to the contact 24', becomes progressively more positive with respect to the cost contacts 102', 202', and 302' as long as an unbalanced positive deviation exists.

By virtue of the foregoing structure and relationships, and in the manner described above in connection with the portion 13, the polarized lowering relay coils 104′, 204′, and 304′ of the portion 16 compare and respond to the potential differences between the corresponding cost contacts 102′, 202′, and 302′ and the reference signal contact 24′, and hence compare and respond to the values of the corresponding plant cost signals relative to the value of the lowering reference signal, to determine on a cost basis which of the plants should first receive lowering impulses upon the occurrence of a positive deviation. Accordingly upon a progressive upward motion of the reference contact 24′ and the corresponding progressive increase in the reference signal between the conductor 26′ and the cost contacts 102′, 202′, and 302′, the first relay to close its contacts and cause its plant to be connected by the portion 18 of the section 12 to receive lowering impulses will be the relay whose associated cost contact is the closest to the bottom of its cost resistor and whose plant thus has the highest cost among the three plants. If the magnitude of the positive deviation is such as to require more than one plant to receive lowering impulses, as evidenced by the further progressive increase of the reference signal following the picking up of the first relay, the second relay to be picked up will be the one whose plant cost signal is the higher of the remaining two, and so on.

In the foregoing manner, the lowering portion 16 of the section 10 selects the plants in the order of their decreasing incremental delivered energy costs in choosing which plants are to be connected by the section 18 to receive lowering impulses, this order of selection resulting in an economical division of the system generation among the plants.

As in the case of the portion 13, the portion 16 includes interlock contacts 110′, 111′, and so on. For the portion 16, these contacts are low limit contacts, and are provided for the purpose of disconnecting the corresponding one of the lowering relay coils from its energizing circuit whenever the application of lowering impulses to the corresponding plant has resulted in the lowering of the output of that plant to a predetermined minimum value therefor. Each of these sets of limit contacts may well be the low limit contacts of the corresponding one of the aforementioned plant load recorders. By virtue of these low limit contacts, plants reaching the predetermined lower limits of their generation are automatically prevented from receiving further lowering impulses and from having their generation further reduced, and are replaced for receiving any further lowering impulses by the higher cost one of the remaining plants.

It may be found to be necessary or desirable, in some cases, to provide interlocking of the coil circuits of the raising and lowering relays so as to prevent the foregoing economic control of the system generation from resulting in the loading of one or more tie lines to values in excess of predetermined, established limits. For example, such interlocking might well be effected by contacts similar to the plant high and low limit contacts 110—111, 110′—111′, etc., which would be arranged to be actuated, upon intrasystem tie line loads reaching preset limit values, so as to prevent one or more plants from being connected to receive raising impulses where such connection and subsequent plant generation increase would result in the tie line loads exceeding said limit values. Such contacts would also desirably be arranged to effect the selection of other plants, possibly in other areas, to take the place of the above plants as to receiving raising impulses and increasing the system generation. Said other plants would be selected on the basis that the routing of raising impulses thereto, and the increase in the generation thereof, would not increase the tie line loading above said preset values.

*The portion 14 of the section 11*

The purpose of the reference signal controlling section 11 is to impart to the reference contacts 24 and 24′ in the section 12 the adjustments described above which result in the repositioning of one or the other of these contacts depending on the direction of the schedule deviation. To this end, the raising portion 14 of the section 11 includes a deviation slide wire resistor 27 having an adjustable contact 28. The contact 28 is adjusted and positioned in accordance with the sense and magnitude of any schedule deviation by means of suitable schedule deviation determining apparatus, such as the so-called master controller shown by way of example in Fig. 2 and to be described hereinafter. Said master controller effects the adjustment and positioning of the deviation contact 28 by means of a linkage 29.

The contact 28 is arranged to be actuated through the linkage 29 in such a manner that the contact is positioned at the upper end 30 of the resistor 27 when a negative schedule deviation of the highest magnitude exists, and is positioned at the midpoint 31 of the resistor 27 when there is zero schedule deviation. When a positive deviation exists, the contact 28 is positioned along the resistor 27 below the midpoint 31, but the effect on the contact 28 is then the same as for zero deviation, since the lower end of the resistor 27 is unconnected. The purpose of the lower portion of the resistor 27 below the midpoint 31 is to provide a support for the contact 28 to move along for positive deviations, which are handled by the portion 17 as will be described hereinafter.

The upper end 30 of the resistor 27 is connected through a resistor 32 to a positive energizing or supply conductor 33, while the midpoint 31 of the resistor 27 is connected to a negative supply conductor 34. The conductors 33 and 34 are adapted to be connected to a source of unidirectional voltage, such as a battery 35. Accordingly, the resistor 27 or, more specifically, the upper half thereof, is connected between and energized from the conductors 33 and 34. If desired, the separate D.C. sources represented by the batteries 22 and 35 may be replaced by a single D.C. source.

The deviation resistor 27 forms part of a bridge-like arrangement in the portion 14 having another part or deviation balancing circuit 36 controlled by the balancing contacts of the raising relays. Specifically, the balancing circuit 36 includes a balancing conductor 37 which is connected to the conductor 34 by a resistor 38. The conductor 37 is also connected to the positive supply conductor 33 by three parallel paths, each of which is in one of the component groups 100, 200, and 300 and includes the deviation balancing contacts for the plant raising relay of the corresponding plant connected in series with a respective one of balancing resistors 113, 213, and 313. Thus, the balancing contacts 106–107 are connected in series with the resistor 113 in the group 100 for Plant 1 between the conductors 33 and 37, and so on.

As a result of the foregoing connections for the deviation resistor 27 and positioning of the deviation contact 28 through the linkage 29, the deviation potential of the contact 28, with respect to a datum such as the negative conductor 34, has a positive magnitude which is dependent upon the magnitude of any negative schedule deviation in the system. Further, as a result of the foregoing connections and arrangements within the balancing circuit 36, the balancing potential of the balancing conductor 37, with respect to the datum conductor 34, has a positive magnitude dependent upon the number of balancing contacts closed, and hence upon the number of raising relays energized and the number of plants receiving raising impulses. A difference between these deviation and balancing potentials indicates that the number of plants connected to receive raising impulses at any time is not commensurate with the existing magnitude of the deviation.

The above noted potential difference between the deviation contact 28 and the balancing conductor 37 is employed to control the position and potential or raising reference signal of the reference contact 24, and hence to control the selection of the raising relays, as necessary to cause the balancing potential of the conductor 37 to balance the deviation potential of the contact 28, and hence to reduce said potential difference toward zero. This results in the number of selected raising relays and plants being maintained proportional to the magnitude of the negative deviation, as is desired.

In employing the potential difference between the deviation contact 28 and the balancing conductor 37 to control the positioning of the reference contact 24 and the production of the raising reference signal, the potential of the contact 28 is compared with that of the conductor 37. This comparison is effected by means of a zero-center contacting galvanometer 39 whose coil is connected between the contact 28 and the conductor 37, these two points forming the output of the bridge arrangement. Conductors 40 interconnect the contacts, not shown, of the galvanometer 39 and a suitable source of motor energizing voltage, not shown, with a motor 41 which positions the reference contact 24 through the linkage 25 in accordance with the deflection of the pointer of the galvanometer 39 from its zero-center position, and hence in accordance with unbalance between the potentials of the deviation contact 28 and the balancing conductor 37.

As long as the potential of the conductor 37 is substantially equal to that of the contact 28, so that the potential difference across the galvanometer 39 is substantially zero or at least within the dead band of the galvanometer, any negative deviation is balanced, and the motor 41 is not energized for rotation in either direction, but remains stationary, as does the contact 24. When, due to motion of the deviation contact 28 and/or opening or closing of one or more of the balancing contacts 106—107, 206—207 and 306—307, the deviation is no longer balanced, there results an unbalance potential difference or signal across the galvanometer 39 of a polarity dependent upon which of the deviation and balancing potentials is positive with respect to the other, and upon whether the deviation is greater or less than the balancing effect. Under such conditions, the galvanometer pointer is deflected from its zero-center position in the corresponding direction, and the motor 41 is energized through the galvanometer contacts for rotation in a corresponding direction. Accordingly, the contact 24 is moved progressively along the resistor 23 in a corresponding direction as long as the deviation is not balanced or, in other words, as long as the deviation is not accompanied by the selection of the number of plants necessary to make the balancing potential on the conductor 37 substantially equal to the deviation potential on the contact 28.

There will now be described the specific manner in which the selection of the required number of plants to receive raising impulses results in the balancing of the negative deviation, or, more particularly, the manner in which the apparatus is made to select the proper number of plants to cause the deviation to be balanced, and, in so doing, to cause the number of plants so selected to be proportional to the magnitude of the deviation. To this end, it is noted that the portion 14 is in the balanced condition, and the existing value of negative deviation is balanced, whenever neither of the potentials of the conductor 37 and the contact 28 is sufficiently positive with respect to the other to cause the galvanometer 39 to close its contacts and effect the operation of the motor 41. This condition exists as long as the number of plants selected and connected to receive raising impulses is commensurate with the existing magnitude of the negative deviation, as represented by the position and potential of the contact 28.

For example, when there is zero or a positive deviation, and hence no negative deviation, the contact 28 will be at or below the point 31, and will be substantially at the potential of the negative conductor 34. The reference contact 24 will be adjacent its lower limit of travel at this time, and the value of the raising reference signal will be below the plant cost signal values. Accordingly, none of the plants will be connected to receive raising impulses, none of the balancing contacts of the raising relays will be closed, and the conductor 37 will be connected solely to the negative conductor 34, through the resistor 38, and will be at the potential of the conductor 34, as will the contact 28. There will, therefore, be no appreciable potential difference across the galvanometer 39, and no operation of the motor 41.

Upon an increase in the negative deviation which causes the contact 28 to go sufficiently positive with respect to the conductor 37 to actuate the galvanometer 39, the latter closes its contacts to cause the motor 41 to move the reference contact 24 progressively upward along the resistor 23. This causes the positive raising reference potential or signal on the reference contact 24 to increase progressively. When this signal exceeds the cost signal for a plant, the corresponding raising relay is energized, and this plant is supplied with raising impulses. Such energization of the relay also causes the corresponding set of the balancing contacts 106—107, 206—207, and 306—307 to close in the circuit 36, which causes the balancing conductor 37 to be connected to the positive energizing conductor 33 through the corresponding one of the resistors 113, 213, and 313. This in turn causes the potential of the conductor 37 to move in the positive direction with respect to the contact 28.

If the magnitude of the deviation is such that this balancing contact closure causes the conductor 37 to become sufficiently positive so as to be substantially as positive as the contact 28 and hence so as to reduce the potential difference across the galvanometer 39 to a value within its dead band, motor 41 is stopped, the upward motion of the contact 24 and the increase in the raising reference signal are arrested, and the deviation is said to be balanced. For the purpose of preventing hunting, it is desirable to have the dead band of the galvanometer 39 slightly greater than the change in potential of the conductor 37 produced by the closing of any one set of the balancing contacts.

If, on the other hand, the magnitude of the deviation is such as to require at least another plant to be connected to receive raising impulses in order to balance the deviation, the foregoing closure of the one set of balancing contacts will not raise the positive potential of the conductor 37 sufficiently to balance the positive potential of the contact 28. Accordingly, the operation of the motor 41 will not be terminated at this time, and the reference contact 24 will continue to be driven upward. This condition will continue until a sufficient number of plants has been added to the group receiving raising impulses to cause a sufficient number of balancing contacts to close and connect the balancing conductor 37 to the positive conductor 33 as necessary to raise the potential of the conductor 37 to the point where this potential balances that of the deviation contact 28 within the galvanometer dead band. When this occurs, further motion of the motor 41 and contact 24 is prevented, and the deviation is balanced.

It is clear from the foregoing that, in each case, the motor 41 continues to reposition the reference contact 24 (up to its limit of travel) until the deviation is balanced by the selection of a sufficient number of plants and the closing of a sufficient number of sets of balancing contacts to substantially equalize the balancing and deviation potentials across the galvanometer 39. When this occurs, the number of plants selected and connected to receive raising impulses is proportional to the magnitude of the deviation.

Decreases in the negative deviation cause plants having picked-up raising relays to be taken off of raising control as necessary to maintain the number of plants on raising control proportional at any time to the currently existing magnitude of the deviation. Thus, as the plants which are receiving raising impulses increase their output and thus cause the negative deviation to diminish in magnitude, the contact 28 moves downward toward the zero deviation point 31 and becomes less positive, thus causing the positive potential of the conductor 37 to exceed that of the contact 28. When the resulting potential difference across the galvanometer 39 becomes sufficiently large, with the conductor 37 sufficiently positive with respect to the contact 28, the galvanometer 39 closes its contacts to cause the motor 41 to move the reference contact 24 progressively downward and reduce the raising reference signal. As a result, energized raising relays drop out in the descending order of the corresponding plant costs, causing the positive potential of the conductor 37 to decrease, as the balancing contacts open, until the potential of the conductor 37 is no longer sufficiently positive with respect to the contact 28 to maintain the galvanometer contacts closed and the motor 41 in operation. When this occurs, the motor 41 is stopped, the downward motion of the reference contact 24 and the decrease in the raising reference signal are arrested, the new, lower value of negative deviation is balanced, and the number of plants left connected to receive raising impulses is proportional to this new value of the deviation. Thus, the number of plants connected to receive raising impulses is at all times kept commensurate with the magnitude of the negative deviation as the latter increases and decreases.

*The portion 17 of the section 11*

As was previously noted herein, the lowering portion 17 of the section 11 is essentially identical to the raising portion 14, as just described, except with being concerned with positive schedule deviations and lowering impulses. The portion 17 thus includes components and connections duplicating those of the portion 14 but arranged to respond to positive deviations for positioning the lowering reference signal contact 24' in the portion 16 to effect the selection of plants to receive lowering impulses.

Specifically, the portion 17 includes a deviation slide wire resistor 27' whose contact 28' is positioned in synchronism with the contact 28 by the linkage 29 in accordance with the sense and magnitude of any schedule deviation. The contact 28' is actuated in such a manner that it is positioned at the lower end 30' of the resistor 27' when a positive deviation of the highest magnitude exists, and is positioned at the midpoint 31' of the resistor 27' when there is zero schedule deviation. When a negative deviation exists, the contact 28' is positioned along the resistor 27' above the midpoint 31', but the effect on the contact 28' is then the same as for zero deviation, since the upper end of the resistor 27' is unconnected. The purpose of the upper portion of the resistor 27' above the midpoint 31' is to provide a support for the contact 28' to move along for the negative deviations handled by the portion 14 as described above.

In view of the foregoing, it is seen that the deviation contacts 28 and 28' move up and down together over their respective resistors 27 and 27' as the schedule deviation changes. The deviation scale and pointer arrangement 42 shown in Fig. 1 is of assistance in showing the relationship between the sense and magnitude of the deviation and the positions and movements of the contacts 28 and 28'.

The lower end 30' of the resistor 27' is connected through a resistor 32' to the positive supply conductor 33, while the midpoint 31' is connected to the negative supply conductor 34. Accordingly, the lower half of the resistor 27' is connected between the conductors 33 and 34. By virtue of these connections, the existence of an increasing positive deviation and the resulting downward movement of the contact 28' cause the latter to become increasingly positive with respect to the datum conductor 34 as the positive deviation increases. Accordingly, there is produced on the contact 28' a positive deviation potential of a positive magnitude, with respect to the datum conductor 34, which is dependent upon the magnitude of any positive deviation in the system. This positive potential is the counterpart of that developed on the contact 28 for an increasing negative deviation.

The portion 17 also includes a balancing circuit 36' having a balancing conductor 37' which is connected, along with the contact 28', across a contacting galvanometer 39' to control a motor 41' which positions the reference contact 24', all as for the portion 14. Since the arrangement and operation of this lowering apparatus are the counterparts of those of the corresponding raising apparatus described in detail hereinbefore, it is sufficient to note that there is insufficient difference between the potentials of the contact 28' and the conductor 37' to cause the operation of the motor 41' as long as the number of plants selected to receive lowering impulses, and hence the number of closed balancing contacts, is commensurate with the magnitude of the positive deviation. When, due to an increase in this deviation or to the opening of a previously closed pair of the balancing contacts 106'—107', etc., the contact 28' becomes significantly positive with respect to the conductor 37', the galvanometer 39' is caused to set the motor 41' in operation to move the reference contact 24' progressively upward and hence increase the lowering reference signal. This action continues until the ensuing selection of plants to receive lowering impulses, and the closing of the corresponding balancing contacts, results in the increase in the positive potential of the conductor 37' necessary to reduce the potential difference across the galvanometer 39' to the point where the motor 41' is deenergized. When this occurs, the positive deviation is balanced, and the number of plants connected to receive lowering impulses is commensurate with the existing magnitude of the deviation.

Upon a sufficient decrease in the positive deviation from a balanced value to cause the potential of the conductor 37' to become sufficiently positive with respect to the contact 28' to set the motor 41' in operation, the resulting progressive reduction in the lowering reference signal and dropping-out of energized lowering relays reduces the positive potential on the conductor 37' until the galvanometer 39' is balanced and the motor 41' is deenergized. Once again, the deviation will have been balanced, with the number of plants now connected to receive lowering impulses being commensurate with the new, lower magnitude of the positive deviation.

*The section 12*

The control impulse applying or connecting section 12 includes in its raising portion 15 the impulse supplying contacts 108—109, 208—209, and 308—309 of the raising relays, and includes in its lowering portion 18 the impulse supplying contacts 108'—109', 208'—209', and 308'—309' of the lowering relays. When a raising relay coil in the portion 13 becomes operatively energized, the resultant closing of the corresponding set of contacts in the portion 15 causes the corresponding plant to be connected to receive raising impulses supplied to the portion 15. Similarly, the energization of a lowering relay coil in the portion 16 and the resultant closing of the corresponding set of contacts in the portion 18 cause the corresponding plant to be connected to receive lowering impulses supplied to the portion 18.

To this end, the portion 15 includes a raising impulse conductor 43 and a common conductor 44, between which the portion 15 is supplied with raising impulses by control impulse producing means of conventional form, such as the master controller shown by way of example in Fig. 2. The portion 18 includes a corresponding lowering impulse conductor 43' which, together with the common conductor 44, supplies to the portion 18 lowering impulses produced by the master controller of Fig. 2.

As will be explained more fully in connection with the description of the Fig. 2 apparatus to be presented hereinafter, the raising and lowering impulses produced by the master controller may well, in accordance with the customary practice, be produced and supplied to the section 12 only when a deviation of the corresponding sense exists. Also, these impulses may well be of the conventional type having an impulse duration which is related to the magnitude of the corresponding deviation. For the purposes of the present description, it will thus be assumed and considered herein that the raising impulses are produced and caused to appear between the conductors 43 and 44 only in the presence of a negative schedule deviation, and that, when so produced, they occur at regular intervals with an impulse duration which is proportional to the magnitude of the negative deviation and to the extent of the generation change required to eliminate this deviation. Similarly, it will be assumed and considered that the lowering impulses are produced and applied between the conductors 43' and 44 only in the presence of a positive schedule deviation, and that their duration is proportional to the magnitude of the positive duration and to the extent of the generation change required to eliminate this deviation.

The portion 15 also includes pairs of output conductors 114, 214, and 314, over each of which pairs the raising impulses are sent to the corresponding plant when the latter is selected to receive such impulses. The right-hand one of each pair of output conductors is connected directly to the common conductor 44, while the left-hand conductor of each pair is connected to the raising conductor 43 through the corresponding set of contacts 108—109, etc. Accordingly, when Plant 1, for example, is selected to receive raising impulses, and the raising relay coil 104 for this plant is operatively energized to close the contacts 108—109, the output conductors 114 are connected between the raising impulse supply conductors 43 and 44, and send or apply raising impulses to Plant 1. Such application may be direct, or may involve a telemetering link. In any case, each plant which is furnished such impulses is arranged and equipped in the known manner to respond to these impulses, as well as to the lowering impulses when supplied by the portion 18, and to increase or decrease its generation progressively, within its operating limits, as long as it receives the raising or lowering impulses, respectively.

The portion 18 includes pairs of output conductors 114', 214', and 314', over each of which pairs the lowering impulses are sent to the corresponding plant when the latter is selected to receive such impulses. The left-hand one of each of these pairs of conductors is connected directly to the common impulse conductor 44, while the right-hand conductor of each pair is connected to the lowering impulse conductor 43' through the corresponding set of contacts 108'—109', etc. Accordingly, when Plant 3, for example, is selected to receive lowering impulses, and the lowering relay coil 304' for this plant is operatively energized to close the contacts 308'—309', the output conductors 314' are connected between the lowering impulse supply conductors 43' and 44 and send or apply lowering impulses to Plant 3.

Typical operation of the Fig. 1 apparatus

As an example of the typical operation of the Fig. 1 arrangement as just described, let it be assumed that the controlled system is meeting its scheduled tie line load and/or frequency requirements in the most economical manner. Accordingly, the total system generation as required to meet the scheduled requirements will be divided among Plants 1, 2, and 3 in the most economical manner, so that the total cost for this generation has a minimum value. As a result of the accompanying substantial equality between the plant incremental delivered energy costs, referred to herein simply as plant costs, all of the cost contacts 102, 202, 102', etc., will be positioned by the computer 19 at approximately the same points on their respective cost resistors 101, 201, 101', etc., and all of the plant cost signals will thus be substantially equal. Also, as a result of the fulfillment of the scheduled system requirements, there will be substantially no schedule deviation, and the deviation contacts 28 and 28' will be substantially at the respective midpoints 31 and 31' of their respective deviation resistors 27 and 27'.

Assuming also that none of the plants is connected to receive raising or lowering impulses, as is proper for a condition of zero deviation, and that the portions 14 and 17 are therefore balanced and provide substantially no unbalance potential differences across the respective galvanometers 39 and 39', the motors 41 and 41' will be at rest, as will the reference contacts 24 and 24' on their respective reference resistors 23 and 23'. Further, the values of the respective raising and lowering reference signals on the respective reference conductors 26 and 26' will be below any and all of the cost signals on the cost contacts, which cost signals will be substantially equal as noted above. For this reason, none of the raising or lowering relays will be operatively energized, and none of the plants will be connected to receive raising or lowering impulses, as noted above. Moreover, no such impulses will be supplied to the section 12, since there will be no deviation.

Let it now be assumed that a change occurs in the system conditions such that a negative schedule deviation results. Such a change could, for example, be a decrease in an outgoing tie line load below the scheduled value therefor, and requires an increase in the system generation and the use of raising impulses in order to cause the scheduled conditions to be met once again and the deviation to be eliminated.

Upon the occurrence of such a system condition change and the resulting negative deviation, the contact 28 is moved upward by the linkage 29 from the point 31 on the resistor 27 by an amount which is proportional to the magnitude of the deviation. As a result, the contact 28 becomes positive by a corresponding amount with respect to the balancing conductor 37, which remains at zero potential, and hence has no balancing potential or signal thereon, due to the fact that none of the balancing contacts 106—107, etc., is then closed. Thus, it can be said that a deviation potential or signal appears on the contact 28 having a magnitude corresponding to that of the deivation. Since there is no balancing signal on the conductor 37, the deviation signal on the contact 28 causes an unbalance potential difference or signal to be applied across the galvanometer 39.

The foregoing adjustment of the contact 28 in the raising portion 14 in accordance with the magnitude of the negative deviation is accompanied by a corresponding adjustment of the contact 28' upward from the point 31' in the lowering portion 17. However, this does not change the potential of the contact 28' nor subject the galvanometer 39' to an unbalance signal since, as previously explained, the upper end of the slide wire 27' is unconnected. Thus, a negative deviation has no effect on the lowering portion 17 as is intended, this portion being arranged to be operative only in the presence of positive deviations. Accordingly, no further attention need be given to the portion 17, or to the other lowering portions 16 and 18, while describing the present typical operation involving a negative deviation.

Two additional changes occur in the Fig. 1 apparatus as a result of the above-assumed system change and accompanying negative deviation. In the first place, the costs for the plants will no longer be substantially equal as they were prior to the system change, with the result that the cost contacts 102, 202, etc. are repositioned by the computer 19 as necessary to make the values of the cost signals agree with the relative plant costs now in effect. Secondly, the presence of the negative deviation causes a supply of raising impulses to be applied to the conductors 43 and 44 by the Fig. 2 apparatus for application by the portion 15 to the plants selected by the portions 13 and 14, the duration of these impulses being a function of the magnitude of the deviation as explained hereinbefore.

The foregoing production and appearance of the unbalance signal across the galvanometer 39 causes the latter to energize the motor 41 for operation in the direction to raise progressively the reference contact 24 in the portion 13, and hence to increase progressively the raising reference signal on the reference conductor 26. At the point at which this reference signal exceeds the lowest of the three cost signals, this being the cost signal for the lowest cost plant, the corresponding raising relay becomes operatively energized. Assuming, by way of example, that Plant 2 is this lowest cost plant, the relay coil 204 becomes operatively energized and effects the closing of the associated balancing contacts 206—207 in the portion 14, and the associated impulse applying contacts 208—209 in the portion 15. The closing of the contacts 208—209 causes the raising impulses between the conductors 43 and 44 to be applied at once to Plant 2 over the conductors 214 for increasing the generation thereof at the appropriate rate dictated by the impulse duration of the raising impulses.

The closing of the balancing contacts 206—207 connects the balancing conductor 37 to the positive conductor 33 through the resistor 213, and hence causes a positive balancing signal to appear on the conductor 37. Assuming that the magnitude of the deviation is such that the selection of but a single plant to receive raising impulses is commensurate with this magnitude and with that of the need for system generation correction, the deviation signal existing on the contact 28 will be such that the above balancing signal produced on the conductor 37 reduces the unbalance signal across the galvanometer 39 to a value within the dead band of the latter. As a result, the motor 41 is no longer energized for rotation, and the progressive motion of the contact 24 and increase in the reference signal are arrested, the reference signal remaining at the value at which the Plant 2 raising relay picked up. Accordingly, the existing deviation is balanced by the selection of Plant 2 to receive raising impulses, and the latter continues to receive such impulses and to increase its generation until the deviation is substantially reduced or Plant 2 becomes loaded to its predetermined maximum capacity.

In the event that the latter condition occurs before the deviation is reduced, the deviation and reference signals will have the above values at the time that Plant 2 becomes fully loaded and the high limit contacts 210—211 open. This limit contact opening deenergizes the relay coil 204, which in turn causes the opening of the balancing contacts 206—207 and the impulse applying contacts 208—209. As a result, Plant 2 no longer receives raising impulses, and hence is not further urged to increase its generation. Also, the balancing signal is removed from the conductor 37 and, since the same deviation signal is still present on the contact 28, an unbalance signal again appears across the galvanometer 39 and causes the motor 41 to resume its progressive upward positioning of the contact 24 and progressive increasing of the reference signal until the latter exceeds the cost signal of the lower cost of the two remaining plants. When this occurs, the last mentioned plant is selected to receive the raising impulses and to balance the existing deviation in place of the fully loaded Plant 2 which has just been prevented from further receiving such impulses.

If, on the other hand, the increase in the generation of Plant 2 produced by virtue of the raising impulses causes the system generation to be increased sufficiently to reduce the deviation prior to the time at which Plant 2 becomes fully loaded, the contact 28 is moved back downward toward the point 31, and the deviation signal is reduced, as the deviation diminishes. Accordingly, a point is reached at which the steady balancing signal on the conductor 37 exceeds the decreasing deviation signal sufficiently to produce across the galvanometer 39 an unbalance signal of sufficient magnitude to cause the galvanometer to energize the motor 41 for operation in the reference signal reducing direction. The resulting progressive reduction in the reference signal on the conductor 26 causes the Plant 2 raising relay coil 204 to be deenergized at the point at which the decreasing reference signal drops below the existing Plant 2 cost signal on the cost contact 202. At that time, the resulting opening of the contacts 208—209 terminates the application of the raising impulses to Plant 2. It is noted, however, that the rate of increase in generation for Plant 2 has already diminished, due to the diminishing impulse duration which accompanies the decrease in the deviation.

The simultaneous opening of the contacts 206—207 removes the balancing signal from the conductor 37, which in turn removes the unbalance signal from across the galvanometer 39, since the deviation signal on the contact 28 is by this time small and approaching zero. As a result, the operation of the motor 41 and the progressive reduction in the reference signal cease, with the latter at some value below the smallest of the three cost signals, and with no plants connected to receive impulses.

By virtue of the foregoing operation, the system will now be operating in accordance with scheduled values and with the increased generation needed to eliminate the foregoing departure from schedule and the deviation, the additional generation being supplied by the plant having the lowest cost. Since the plant chosen to take on this additional generation is the lowest cost plant, the system operation at the new, higher generation level will still be operation in the most economical manner.

The explanation just given of the manner in which the Fig. 1 apparatus operates to terminate the application of raising impulses to Plant 2 upon the decrease in the negative deviation applies as well, with respect to the replacing plant, in the previously described case where Plant 2 became fully loaded and was replaced by another plant prior to the decrease in the deviation. For example, if Plant 2 became fully loaded prior to the elimination of the deviation, and if Plant 3 where the plant selected to take the place of Plant 2 for receiving the raising impulses, it would be Plant 3 which would have its raising relay deenergized upon the decrease in the deviation produced by the increase in system generation in the manner described above.

In the foregoing example of the operation of the Fig. 1 apparatus, one of the stated assumptions was that the initial magnitude of the negative deviation and need for system generation correction of the example were such that the selection of but a single plant to receive raising impulses was warranted and effected. Let it now be assumed, by way of another example, that the magnitude of the negative deviation resulting from the above-assumed system change is such as to require more than a single plant to be selected and caused to receive raising impulses in order that the number of plants so selected be commensurate with the magnitude of the deviation, and hence that the deviation be balanced. In this case, the foregoing closure of the Plant 2 balancing contacts 206—207 will not cause the value of the balancing signal on the conductor 37 to be sufficiently large, with respect to the presently assumed larger deviation signal on the contact 28, to reduce the unbalance signal on the galvanometer 39 to the motor-stopping value. Therefore, the operation of the motor 41 to increase the reference signal will not be terminated at this time, but will continue to cause the reference signal to increase progressively.

At the point at which the increasing reference signal exceeds the cost signal of the lower cost one of the two remaining plants, Plant 3, for example, the raising relay coil 304 becomes operatively energized, whereby contacts 306—307 and 308—309 close. The closure of the contacts 308—309 causes Plant 3 to join Plant 2 in receiving raising impulses, and the closure of the contacts 306—307 causes a still further increase in the balancing signal. If this increased balancing signal is now of sufficient magnitude to balance the deviation signal and reduce the galvanometer unbalance signal to the motor-stopping value, the increasing of the reference signal is terminated and the portion 14 is balanced. In this case, the deviation is balanced by the selection of two plants to receive raising impulses, which means that the deviation magnitude is such that the selection of two plants is commensurate therewith.

If the last mentioned increased balancing signal is still insufficient to balance the deviation signal and stop the motor 41, as in the case of a relatively large deviation, the reference signal continues to be progressively increased until it exceeds the cost signal of the last plant, Plant 1, and causes the relay coil 104 to be operatively energized. Thus, Plant 1 is added to the group of plants connected to receive raising impulses.

If the closure of the Plant 1 balancing contacts 106—107 results in a value of the balancing signal which reduces the galvanometer unbalance signal sufficiently to stop the motor 41, the deviation will be balanced by the selection of three plants to receive raising impulses. If, however, the selection of Plant 1 still fails to balance the deviation and stop the motor 41, as may occur for a very large deviation, the increase in the reference signal continues until the contact 24 reaches its upper limit of travel. However, since all three of the plants are now connected to receive raising impulses, it will not be long until the resulting increase in the plant and system generation, and the concurrent decrease in the negative deviation, cause the motor 41 to operate in the opposite direction and to start the progressive decrease in the reference signal.

When this occurs, the raising relay of the highest cost plant will be deenergized first, in the same manner as described above in detail for the dropping of plant 2 in the presence of a decreasing deviation. This termination of the application of raising impulses to the highest cost plant will be followed, as the deviation and reference signals are further decreased, by the deenergization of the relay and the dropping of the higher cost one of the two remaining plants, and so on, depending upon how many plants are connected to receive raising impulses. In each case, the number of plants remaining connected to receive raising impulses is proportional to the existing magnitude of the deviation.

Finally, when the deviation has been eliminated by the increased generation, the system will once again be meeting its scheduled requirements in the most economical manner, with no plants connected to receive raising impulses, and with the required additional generation being supplied at the minimum cost possible under the existing conditions. This economical operation is the result of the foregoing economical order of selection and dropping of plants effected by the apparatus.

It is evident from the foregoing that the appearance of a negative deviation causes one plant after another to be connected to receive raising impulses, starting with the lowest cost plant, until the number of plants so selected by the progressively increasing reference signal, as represented by the balancing signal, balances the deviation signal and hence is proportional to the magnitude of the deviation. At this time the existing deviation is balanced and the further increase of the reference signal is prevented. Thus, all of the plants are selected and connected to receive raising impulses if the magnitude of the deviation is sufficient to require it.

As the selected plants increase their generation, the deviation decreases and the reference signal is started on its progressive reduction, causing one after another of the selected plants to be dropped from raising control, starting with the highest cost plant. This continues until the decreasing balancing signal balances the decreased deviation signal and terminates the decrease of the reference signal. Finally, when the deviation has been substantially completely reduced, the apparatus will be balanced with no plants connected to receive raising impulses.

Upon the occurrence of a system condition change which requires a decrease in the system generation and hence results in a positive schedule deviation, the operation of the portions 16, 17, and 18 to select plants to receive lowering impulses duplicates the operation of the portions 13, 14, and 15 described above for the examples involving a negative deviation and the use of raising impulses. Therefore, with respect to an example of the typical operation of the Fig. 1 apparatus upon the occurrence of a positive deviation, it is sufficient to note that such a deviation causes the contact 28′ to move downward on the resistor 27′ by an amount proportional to the deviation, which in turn causes a deviation signal to appear on the contact 28′. This signal, in the absence of any balancing signal on the conductor 37′, results in the application of an unbalance signal to the galvanometer 39′ of a sense to cause the latter to energize the motor 41′ to increase progressively the lowering reference signal on the conductor 26′ in the portion 16.

At the point at which the increasing lowering reference signal exceeds the lowest of the three plant cost signals on the respective contacts 102′, 202′, and 302′, corresponding to the highest cost plant, the corresponding lowering relay becomes operatively energized. Assuming that this highest cost plant is Plant 1, the operative energization of the relay coil 104′ and the resultant closing of the contacts 108′—109′ in the impulse applying portion 18 cause the lowering impulses then supplied between the conductors 43, and 44 to be applied to Plant 1 over the conductors 114′ for decreasing the generation of Plant 1 at the appropriate rate. The simultaneous closing of the balancing contacts 106′—107′ in the portion 17 causes a corresponding balancing signal to appear on the conductor 37′.

If the magnitude of the deviation is such that the selection of the one plant to receive lowering impulses is sufficient to balance the deviation, the balancing signal produced by the closing of the contacts 106′—107′ reduces the galvanometer unbalance signal to the motor-stopping value, whereby the increasing of the reference signal is terminated. If the deviation is such that the selection of one plant is not sufficient, the balancing signal does not overcome the deviation signal sufficiently to stop the motor 41′, whereby the reference signal is caused to continue to increase. This continues until a number of plants proportional to the deviation magnitude are connected to receive the lowering impulses, at which time a sufficient number of balancing contacts in the circuit 36′ will have closed to raise the balancing signal to the value necessary to balance the deviation signal, to reduce the galvanometer unbalance signal to the motor-stopping value, and to terminate the increase in the reference signal.

When the positive deviation decreases, as it will in the presence of the decrease in generation brought about by the application of the lowering impulses to the appropriate number of plants, the lowering relay of the lowest cost plant will be deenergized first as the balancing signal exceeds the deviation signal and causes the motor 41′ to effect the progressive reduction of the reference signal below the largest cost signal, this being the cost signal for the lowest cost plant. The accompanying termination of the application of the lowering impulses to the lowest cost plant will be followed, as the deviation and reference signals are further decreased, by the dropping of the lower cost one of the two remaining plants, and so on, depending upon how many plants are connected to receive lowering impulses. In each case, the number of plants remaining connected to receive lowering impulses is proportional to the existing magnitude of the deviation.

Finally, when the positive deviation has been eliminated by the decreased generation, the system will once again be meeting its scheduled requirements in the most economical manner, with the required reduction in generation having been achieved by reducing the generation of the highest cost plant first.

The operation of the lowering portions of the Fig. 1 apparatus in the event that one or more of the plants becomes unloaded to its predetermined minimum value is the counterpart of the operation described hereinbefore in connection with plants which reach their maximum generation limits. Thus, when the generation of a plant receiving lowering impulses becomes reduced to the predetermined lower limit, the opening of the corresponding set of the low limit interlock contacts 110'—111', etc., deenergizes the corresponding one of the lowering relays and hence prevents this plant from receiving further lowering impulses and from having its generation further reduced. The simultaneous opening of the corresponding balancing contacts causes the higher cost one of the remaining plants to be substituted for the minimum loaded plant for receiving lowering impulses.

It is evident from the foregoing that the appearance of a positive deviation causes one plant after another to be connected to receive lowering impulses, starting with the highest cost plant, until the number of plants so selected by the progressively increasing reference signal, as represented by the balancing signal, balances the deviation signal and hence is proportional to the magnitude of the positive deviation. At this time the existing deviation is balanced and the further increase of the reference signal is prevented. Thus, all of the plants are selected and connected to receive lowering impulses if the magnitude of the deviation is sufficient to require it.

As the selected plants decrease their generation, the deviation decreases and the lowering reference signal is started on its progressive reduction, causing one after another of the selected plants to be dropped from lowering control, starting with the lowest cost plant. This continues until the decreasing balancing signal balances the decreased deviation signal and terminates the decrease of the reference signal. Finally, when the deviation has been substantially completely reduced, the apparatus will be balanced with no plants connected to receive lowering impulses.

In the foregoing descriptions of the typical operation of the Fig. 1 apparatus, no mention has been made of the fact that the relative plant costs and cost signals may well change as one or more of the plants receives raising or lowering impulses and changes its generation, or as system conditions change. For example, a plant which is the lowest cost plant at the time of the appearance of a deviation may well not still be the lowest cost plant after it and/or others has been receiving the appropriate control impulses for a time. It should be apparent, however, that such changes are automatically taken into account by the Fig. 1 apparatus, since the cost contacts 102, 102', etc., are continuously positioned by the computer 19 in accordance with the existing values of these plant costs.

As an example, let it be assumed that Plant 2 is the lowest cost plant at the time of the appearance of a negative deviation. Accordingly, the cost signal on the contact 202 will be the lowest cost signal at this time, and Plant 2 will be the first plant to be selected to receive raising impulses as the reference signal rises. Let it also be assumed that, after Plant 2 alone has received raising impulses for a time and has increased its generation, the cost for Plant 2 rises above that for Plant 3, whereby Plant 2 is no longer the lowest cost plant. When this occurs, the cost contact 202 and the cost signal for Plant 2 will go above those for Plant 3, with the result that the Plant 2 raising relay will drop out and the Plant 3 raising relay will be operatively energized in its place. Thus, the presently lowest cost Plant 3 will be substituted for the formerly lowest cost Plant 2 to receive further raising impulses. Therefore, it is always the lowest cost plant which is connected to receive raising impulses when a negative deviation prevails unless, of course, the lowest cost plant is fully loaded to its maximum value, as previously explained.

It should be noted that, in practice, a typical system will usually swing continually, to some extent, between conditions of excessive and insufficient generation with respect to meeting the scheduled system requirements, with the result that there will be a continual swing between conditions of positive and negative deviation. Therefore, lowering or raising impulses and changing reference signals will continually be present in the Fig. 1 apparatus. Accordingly, changes in conditions and in plant costs, which call for a reallocation of the system generation among the plants in order to maintain the most economical combination of plant loadings, will be able and effective to cause the required changes in plant generation to take place.

It is clear from the foregoing description that, when severe regulating duty requires changes to be effected in the generation of all available plants, the Fig. 1 apparatus routes the appropriate control impulses to all of these plants automatically. As soon as the rapid system load change has passed, or the changes in the system generation have begun to meet it adequately, the apparatus routes the control impulses to fewer plants, selecting such plants in accordance with their costs and in the order to provide maximum economy of operation.

THE APPARATUS OF FIG. 2

There is shown in Fig. 2, by way of example, a typical form for the source of schedule deviation data and control impulses supplied to and utilized by the Fig. 1 apparatus in the manner described above. The form of such a device chosen for illustration in Fig. 2 is that of the well-known so-called master controller which is illustrated and described, for example, in the Williams et al. Patent No. 2,124,725, particularly in Fig. 6. Since such apparatus is well known in the art, and is fully described in said Williams et al. patent, it is believed that the following brief description thereof will be adequate herein as an explanation of a typical form of arrangement which is suitable for use with the Fig. 1 apparatus.

The Fig. 2 apparatus compares the actual, existing values of the system tie line loads and frequency with the preset scheduled values therefor, and from this comparison produces an effect or signal which is representative of both the magnitude and sense of any deviation between the existing and scheduled values. This effect is used in the Fig. 2 apparatus to produce the deviation contact adjustments made to the Fig. 1 apparatus over the linkage 29, and to control the production of the raising and lowering impulses supplied to the Fig. 1 apparatus over the conductors 43, 43', and 44. To this end, the Fig. 2 apparatus includes a schedule deviation signal and impulse producing section 45, and a deviation signal to position transducing servo section 46. The section 45 includes a schedule deviation determining portion 47 and an impulse producing portion 48.

The portion 47 is supplied in the usual manner with data as to the actual and scheduled tie line load and frequency values, and produces between output conductors 49 and 50 an error or deviation signal of a magnitude and sense which are respectively dependent upon the extent and sense of any departure of the actual system condition values from the scheduled values therefor. Said magnitude and sense are also respectively representative of the extent and direction of the system generation change required to eliminate the departure and the deviation signal.

This deviation signal between the conductors 49 and 50 is applied to the deviation servo portion 46, which in turn converts this signal into the adjustments and motions of the linkage 29 which result in the proper positioning of the deviation contacts 28 and 28' of the Fig. 1 apparatus in accordance with the magnitude and sense of the deviation. For this purpose, the portion 46 includes the usual balancing or follow-up bridge circuit 51 including a follow-up contact 52, error detecting, contacting galvanometer 53, and follow-up motor 54. These elements are interconnected in the usual manner so that the motor 54 is at rest as long as the position of the follow-up contact 52 and the linkage 29, and hence the positions of the deviation contacts 28 and 28' in Fig. 1, correspond to the magnitude and sense of the deviation and deviation signal. This is the balanced condition of the portion 46. When these positions do not correspond to the deviation, the portion 46 is unbalanced, and a servo error signal is applied to the galvanometer 53. The latter then actuates the motor 54 for operation in the proper direction to cause the motor to reposition the linkage 29 and the contact 52 until the portion 46 is returned to the balanced condition.

The deviation signal between the conductors 49 and 50 is also applied to the impulse portion 48 for the purpose of causing the latter to produce the foregoing control impulses of a sense and impulse duration which are respectively dependent upon the sense and magnitude of the deviation and deviation signal. To this end, the portion 48 includes a constantly rotating shaft 55 carrying a raising impulse cam 56 and a lowering impulse cam 57. Cooperating with the latter is a galvanometer 58 which is connected to be energized by the signal between the conductors 49 and 50, and which is provided with a pointer 59. The latter is arranged to be deflected from a neutral position to an extent and in a direction which are respectively dependent upon the magnitude and sense of the deviation.

As described in said Williams et al. patent, the presence of a negative deviation causes the pointer 59 to cooperate with the raising cam 56 and other means, not shown, to cause a raising impulse to be produced between the conductors 43 and 44 for a portion of each revolution of the cam 56. The extent of this portion, and hence the length or duration of each raising impulse, is dependent upon the deflected position of the pointer 59, and hence upon the magnitude of the negative deviation. Similarly, in the presence of a positive deviation, the pointer 59 cooperates with the lowering cam 57 and other means, not shown, to cause a lowering impulse to be produced between the conductors 43' and 44 for a portion of each revolution of the cam 57, this portion and the duration of each lowering impulse being dependent upon the magnitude of the positive deviation. The shaft 55 and cams 56 and 57 are caused to rotate at a uniform rate, whereby the impulses are caused to be repeated at a uniform rate and hence to occur at regular intervals in the presence of a deviation.

THE MODIFICATION OF FIG. 3

In Fig. 3 there is shown a reference signal controlling section 60 for the Fig. 1 apparatus which is a modification of the corresponding section 11 previously described. The section 60 performs in the same general manner with respect to the sections 10 and 12 as does the section 11, and hence can be employed in the Fig. 1 apparatus in place of the section 11, if desired. The construction and specific operation of the section 60 differ somewhat from those of the section 11, however, as will now be described.

In the raising portion 14 of the section 60, the upper end 30 of the resistor 27 is connected directly to the conductor 33, instead of being connected through a resistor 32 as is done in the section 11. Further, the midpoint 31 of the resistor 27 in the section 60 is connected through a resistor 61 to the conductor 34, instead of being connected directly to this conductor as is done in the section 11. Similarly, the lower end 30' of the resistor 27' in the portion 17 of the section 60 is directly connected to the conductor 33, while the midpoint 31' of this resistor is connected through a resistor 61' to the conductor 34.

The balancing circuit 36 of the section 11 is replaced in the section 60 by a similar circuit 62. The latter includes the normally-open raising relay balancing contacts 106—107, etc., the balancing resistors 113, etc., and the balancing conductor 37. In lieu of the resistor 38 of the circuit 36, however, the circuit 62 includes additional, normally-closed raising relay balancing contacts 115—116, 215—216, and 315—316, and additional balancing resistors 117, 217, and 317. The contacts 115—116 are arranged to be actuated by the relay coil 104 through the linkage 105 in such a manner that, when the coil 104 is not operatively energized and the normally-open balancing contacts 106—107 are open, the normally-closed balancing contacts 115—116 will be closed. When the coil 104 is operatively energized, the contacts 106—107 are closed, while the contacts 115—116 are open. The same applies for the others of the normally-open and normally-closed balancing contacts with respect to the corresponding raising relays.

The normally-closed contacts 115—116 are connected in series with the resistor 117 between the reference conductor 37 and the conductor 34. Similarly, the contacts 215—216 and the resistor 217 are connected in series between the conductors 37 and 34, as are the contacts 315—316 and the resistor 317. As a result, the operative energization of a raising relay causes the conductor 37 to be disconnected from the negative conductor 34 and corresponding one of the resistors 117, 217, and 317, and to be instead connected to the positive conductor 33 through the corresponding one of the resistors 113, 213, and 313.

The differences between the balancing circuit 62 of the present section 60 and the balancing circuit 36 of the previous section 11 as just described apply as well to the balancing circuit 62' of the section 60 with respect to the balancing circuit 36' of the section 11. Thus, the balancing circuit 62' of the section 60 includes normally-closed lowering relay balancing contacts 115'—116', etc., and balancing resistors 117', etc., connected between the conductors 37' and 34 in the same manner as the corresponding elements are connected in the circuit 62.

As a result of the foregoing construction of the section 60, the latter provides an operating feature not obtained with the section 11. Specifically, even when there is no deviation, the lowest cost plant and the highest cost plant are connected ready to receive the raising and lowering impulses, respectively, which will be produced upon the occurrence of a negative or a positive deviation, respectively. More specifically, the presence of the resistor 61 causes the raising relay of the lowest cost plant to be operatively energized at all times, and hence causes this plant to be ready to receive raising impulses when produced. Likewise, the presence of the resistor 61' causes the lowering relay of the highest cost plant to be operatively energized at all times, and hence causes this plant to be ready to receive lowering impulses when produced. The manner in which this operation is produced by the section 60 will now be described in more detail.

When there is no schedule deviation, and the deviation contacts 28 and 28' are at rest at their respective points 31 and 31', the presence of the resistor 61 causes a deviation signal to be present on the contact 28. The magnitude of this signal is made to be just sufficient to require one raising relay to be operatively energized in order to cause the balancing signal on the conductor 37 to balance this deviation signal. Thus, the galvanometer 39 causes the motor 41 to raise the position and raising reference signal of the contact 24 progressively until the raising relay of one of the plants picks up and puts the required balancing signal on the conductor 37. This occurs because of the opening of the corresponding set of the normally-closed balancing contacts 115—116, etc., and the accompanying closing of the corresponding set of the normally-open balancing contacts 106—107, etc. This terminates the operation of the motor 41 and the progressive rise of the reference signal. The plant so chosen to receive raising impulses will, of course, be the lowest cost plant.

Under this same condition of no deviation, the presence of the resistor 61′ will have caused the resulting deviation signal on the contact 28′ to have energized the motor 41′ for raising the lowering reference signal on the contact 24′ progressively until the lowering relay for the highest cost plant will have picked up and caused the deviation signal to be balanced. Thus, even when there is no deviation, the lowest cost plant will be connected so as to be ready to receive raising impulses as soon as the latter are produced by the occurrence of a negative deviation, while the highest cost plant will be conencted so as to be ready to receive lowering impulses as soon as the latter are produced by the occurrence of a positive deviation.

In connection with the foregoing, it is noted that the occurrence of a negative deviation does not remove the highest cost plant from the condition of being connected to receive lowering impulses when later produced as the deviation later becomes positive. Similarly, the occurrence of a positive deviation does not remove the lowest cost plant from the condition of being connected to receive raising impulses when later produced as the deviation later becomes negative.

The significance and practical importance of all of this is that, at the time of the occurrence of a negative deviation, the lowest cost plant is already connected to receive the raising impulses which are produced as a result of the deviation. Similarly, the highest cost plant is already connected to receive lowering impulses at the time at which a positive deviation occurs and produces lowering impulses. Thus, in each case, the proper plant is ready to respond to the proper impulses, as soon as produced, without any delay of waiting, after the appearance of the deviation, for the corresponding reference signal to be increased to the value necessary to select this proper plant. As a result, closer and more accurate control of the system conditions is provided and maintained.

As for the section 11, the section 60 is operative to cause the number of plants connected at any time to receive control impulses to be commensurate with the magnitude of the existing deviation. This operation occurs in substantially the same manner as that described hereinbefore in connection with the section 11. Thus, upon the occurrence of a negative deviation requiring more than one plant for its elimination, the resulting progressive upward movement of the reference contact 24 and increase in the reference signal thereon cause a second and, if necessary, the third plant to be added to the raising group. As each raising relay becomes operatively energized, the resulting opening of the corresponding normally-closed balancing contacts and closing of the corresponding normally-open balancing contacts in the circuit 62 cause the positive potential or balancing signal on the conductor 37 to increase and to approach the balance value at which the deviation signal will be balanced, the motor 41 will be stopped, and the increase in the reference signal will be terminated. Thus, the reference signal continues to rise until the balancing signal on the conductor 37 has been increased to the value at which it balances the deviation signal within the galvanometer dead band and thus causes the motor 41 to be stopped. At that time, the number of plants connected to receive raising impulses will be commensurate with the magnitude of the deviation.

In view of the detailed description presented hereinbefore in connection with the typical operation of the section 11 and the Fig. 1 apparatus including it, it is believed that further description of the operation of the corresponding section 60 is unnecessary herein.

THE ARRANGEMENT OF FIG. 4

In Fig. 4 there is shown an anti-hunting circuit arrangement for use between the reference signal contact adjusting motor 41 and the galvanometer 39 of either the section 11 of Fig. 1 or the section 60 of Fig. 3. While this arrangement has been shown in Fig. 4 as being applied to the motor 41, it is noted that such an arrangement is applicable as well to the motor 41′. In fact, when the Fig. 4 arrangement is employed to control the motor 41 in apparatus such as that shown in Fig. 1 or in Fig. 3, a duplicate of the Fig. 4 arrangement is desirably employed to control the motor 41′ from the galvanometer 39′.

The purpose of the Fig. 4 arrangement is to modify the the controlling action of the galvanometer 39 on the motor 41 as necessary to prevent the latter from hunting, as could well occur, in the absence of this arrangement, upon the simultaneous existence of substantially equal incremental delivered energy costs for two or more of the plants. Specifically, a condition occasionally occurs wherein the next plant to be selected, in order of cost, to receive raising impulses has a cost which is exactly or substantially equal to that of another plant. This results in the simultaneous selection of both of these plants to receive raising impulses. This in turn results in a relatively large increase in the balancing signal, due to the simultaneous operation of the balancing contacts of the two raising relays of the selected plants. This increased balancing signal may well then overbalance the deviation signal and hence reverse the unbalance signal across the galvanometer 39, causing the reversal of the galvanometer deflection.

In the absence of the Fig. 4 arrangement, such reversal in the galvanometer deflection results in the reversal of the rotation of the motor 41, whereby the direction of change of the reference signal on the contact 24 is reversed, and this signal is caused to start to decrease. As a consequenc, the raising relays of the two simultaneously selected plants might well become deenergized at exactly the same time, causing a sufficient drop in the balancing signal to make the unbalance signal, galvanometer deflection, and motor rotation reverse once more. Thereafter, the reference signal would be caused to increase again until the raising relays for the last mentioned two plants would again become operatively energized simultaneously and hence cause the aforementioned relatively large increase in the balancing signal to occur once more. This sequence of events would then be repeated, constituting an undesirable hunting action.

The Fig. 4 arrangement prevents such a hunting action or condition from taking place by establishing a hold-out period, following the selection of a plant or plants to receive raising impulses, during which period no plant or plants may be dropped from receiving raising impulses. This prevents the occurrence of the foregoing oscillatory changes in the balancing, unbalance, and reference signals which tend to produce the above hunting condition.

To this end, the Fig. 4 arrangement includes, in addition to the contacting galvanometer 39, the motor 41 energizing connections 40, and the motor 41, a time delay relay 63, a holding relay 64, and a hold-out period timing relay 65. The time delay relay 63 includes an operating coil 66 which controls a pair of normally-open contacts 67—68 through a linkage 69. This relay is of the time delay drop-out type, and thus includes the usual slug 70 cooperating with the coil 66. The time delay drop-out period of this relay is advantageously made to be about one-half second, which means that the contacts 67—68 remain closed for about one-half second after the coil 66 is deenergized.

The holding relay 64 is of the instantaneous type, and includes an operating coil 71 which controls a pair of normally-open contacts 72—73 and a pair of normally-closed contacts 74—75 through a linkage 76. The timing relay 65 includes a timing motor 77 which controls a pair of normally-closed contacts 78—79 through a linkage 80. The relay 65 is arranged to leave the contacts 78—79 closed for a hold-out period of about fifteen seconds after the energization of its motor 77, and to open these contacts upon the expiration of this hold-out period. Upon the subsequent deenergization of the motor 77, the contacts 78—79 close again ready for the next hold-out period, which will start when the motor 77 is next energized.

As shown in Fig. 4, the contacting galvanometer 39 includes a movable contact 81 which is positioned by the galvanometer pointer in accordance with the unbalance signal between the balancing conductor 37 and the deviation contact 28. This unbalance signal, as previously explained, is the resultant of the balancing signal on the conductor 37 and the deviation signal on the contact 28, and is applied across the galvanometer coil, not shown.

Cooperating with the movable contact 81 are two stationary contacts 82 and 83 which are disposed, respectively, on opposite sides of the contact 81. The right-hand contact 82 is a reference signal increasing contact, while the left-hand contact 83 is a reference signal decreasing contact. In the presence of an unbalance signal resulting from the deviation signal exceeding the balancing signal by an amount in excess of the galvanometer dead band, calling for the increase of the reference signal, the contact 81 is caused to engage the contact 82. Conversely, in the presence of an unbalance signal resulting from the balancing signal exceeding the deviation signal by an amount in excess of the galvanometer dead band, calling for the decrease of the reference signal, the contact 81 is caused to engage the contact 83. Conversely, in the presence of an unbalance signal resulting from the balancing signal exceeding the deviation signal by an amount in excess of the galvanometer dead band, calling for the decrease of the reference signal, the contact 81 is caused to engage the contact 83. When the balancing signal balances the deviation signal within the galvanometer dead band, the contact 81 does not engage either of the contacts 82 and 83.

The reference signal adjusting motor 41 is shown in Fig. 4 as including a reference signal increasing winding 84, a reference signal decreasing winding 85, and a cooperating armature 86. The latter is arranged to position the reference contact 24 through the linkage 25 in the manner previously described.

The motor 41 is energized for operation through the galvanometer contacts 81, 82, and 83 from a suitable D.C. source, shown as a battery 87. One terminal of the latter is connected by an energizing conductor 88 to the galvanometer contact 81, while the other terminal of the battery 87 is connected by an energizing conductor 89 to one terminal of the motor armature 86. The other terminal of the latter is connected through the motor winding 84 and a conductor 90 to the galvanometer contact 82, and is connected through the motor winding 85, a conductor 91, and the normally-closed holding relay contacts 74—75 to the galvanometer contact 83.

The coil 66 of the time delay relay 63 is connected between the energizing conductor 89 and the galvanometer contact 82, and hence is connected across the reference signal increasing circuit of the motor 41. Accordingly, the coil 66 is operatively energized whenever the motor 41 is energized for operation in the reference signal increasing direction by the engagement of the galvanometer contacts 81 and 82.

The contacts 67—68 of the relay 63 are included in an energizing circuit for the coil 71 of the holding relay 64 and the timing motor 77 of the timing relay 65. In this circuit, one terminal of the coil 71 and one terminal of the motor 77 are connected to the energizing conductor 89, while the other terminals of the coil 71 and motor 77 are connected through the time delay contacts 67—68 to the galvanometer contact 83, and thence through the galvanometer contact 81 to the other energizing conductor 88.

As previously noted, the normally-closed contacts 74—75 of the holding relay 64 are connected in the energizing circuit for the reference signal decreasing winding 85 of the motor 41. The other, normally-open contacts 72—73 of the holding relay are connected in series with the normally-closed contacts 78—79 of the timing relay between the galvanometer contact 83 and the lower terminals of the coil 71 and motor 77. Thus, the series combination of the contacts 72—73 and 78—79 is connected in parallel with the time delay contacts 67—68.

OPERATION OF THE FIG. 4 ARRANGEMENT

For the condition of balance between the deviation and the number of plants selected to receive raising impulses, the deviation signal on the contact 28 is balanced by the balancing signal on the conductor 37 within the dead band of the galvanometer 39, whereby the galvanometer contacts 81, 82, and 83 are open and the motor 41 is deenergized. Thus, the reference signal is not being changed, as is proper for this condition of balance. The relays 63, 64, and 65 are also deenergized at this time, and their contacts are in the positions shown in Fig. 4.

Upon the occurrence of a change which requires an increase in the reference signal and hence results in the deviation signal exceeding the balancing signal by a sufficient amount to cause the galvanometer contact 81 to move into engagement with the contact 82, the motor winding 84 is energized, whereby the motor 41 operates to increase the reference signal by adjusting the contact 24 in the corresponding direction through the linkage 25. The time delay relay coil 66 is also energized at this time, but the resulting closure of its contacts 67—68 has no effect on the circuit, due to the fact that the galvanometer contact 81 is not engaging the contact 83 at this time.

When the increasing reference signal has resulted in the energization of a sufficient number of raising relays to raise the balancing signal to the balance point at which the unbalance signal is reduced to the value which causes the galvanometer contact 81 to move away from the contact 82, the relay coil 66 and motor winding 84 become deenergized, the motor 41 stops, and the increase in the reference signal is terminated. Assuming that this energization of the raising relays does not cause the balancing signal to increase so greatly that the deviation signal is exceeded sufficiently to cause the galvanometer contact 81 to engage the contact 83, neither of the relays 64 and 65 becomes energized, since the circuit to the coil 71 and motor 77 cannot be completed except when the galvanometer contacts 81 and 83 are in engagement. Accordingly, the arrangement again assumes the balanced condition as shown in Fig. 4.

Even the subsequent engagement of the galvanometer contacts 81 and 83 does not cause the relays 64 and 65 to become energized, since the contacts 67—68 will have opened at the end of the time delay drop-out period for the relay 63 following the above-noted deenergization of the coil 66. Thus, such engagement of the galvanometer contacts 81 and 83 causes the motor winding 85 to be energized, and hence causes the motor 41 to decrease the reference signal by adjusting the contact 24 in the corresponding direction through the linkage 25. Such energization of the motor winding 85 is possible at this time because the contacts 74—75 are in their normally-closed position, due to the fact that the relay 64 is not energized.

The foregoing closure of the galvanometer contacts 81 and 83 would have resulted from the balancing signal exceeding the deviation signal, due to the need for dropping one or more plants from receiving raising impulses. When the necessary number of plants has been so dropped by the action of the decreasing reference signal, the reduced balancing signal once more balances the deviation signal and returns the apparatus to the state of balance shown in Fig. 4.

It was assumed above, in connection with the operation there described, that the energization of the raising relays by the increasing reference signal did not cause the balancing signal to increase so greatly that the galvanometer contact 81, when disengaging the contact 82, went over to the left and engaged the contact 83. Let it be assumed now that, because of another plant having substantially the same cost as the next plant to be selected, the increasing reference signal causes the raising relays of these two plants to pick up simultaneously, while in fact the deviation requires only one plant to be so selected to receive raising impulses. Such action causes a relatively large increase in the balancing signal which in turn causes the galvanometer contact 81 to swing away from the contact 82 over into engagement with the contact 83. In the absence of the Fig. 4 arrangement, this action would cause the motor 41 to be energized to decrease the reference signal, and would result in the establishment of a hunting condition as explained hereinbefore.

In the Fig. 4 arrangement, however, the engagement of the galvanometer contact 81 with the contact 83 immediately following the disengagement of the contact 81 from the contact 82 causes the relays 64 and 65 to be energized. This occurs because the relay 63 will have been energized to close its contacts 67—68 while the galvanometer contacts 81 and 82 were in engagement, and because the contacts 67—68 will still be closed at the time that the contact 81 swings over into engagement with the contact 83, due to the time delay drop-out characteristic of the relay 63, even though the latter is now deenergized. The time delay drop-out period of the relay 63 may be of the order of one-half second in order to assure that the relays 64 and 65 will be energized whenever the galvanometer contact 81 swings immediately from the contact 82 to the contact 83 and indicates the tendency for a hunting condition to be established.

The energizing circuit which is established for the relays 64 and 65 as the galvanometer contact 81 swings from contact 82 over to contact 83 can be traced from the energizing conductor 88 through the contacts 81 and 83, the still-closed contacts 67—68, and the parallel-connected coil 71 and motor 77 to the other energizing conductor 89.

The energization of the relays 64 and 65 produces the following effects in the circuit. In the first place, the resulting opening of the holding relay contacts 74—75 prevents the motor winding 85 from being energized, and hence prevents the reduction in the reference signal which would lead to the hunting condition. Secondly, the resulting closing of the holding relay contacts 72—73 causes the holding relay 64 to seal itself in, since the timing relay contacts 78—79 are closed during this hold-out period established by the energization of the relays 64 and 65. Although the time delay relay contacts 67—68 open shortly after the holding relay contacts 72—73 close, due to the expiration of the time delay drop-out period of the relay 63, the relays 64 and 65 remain energized for the hold-out period of the relay 65 through an energizing circuit which can be traced from the energizing conductor 88 through the galvanometer contacts 81 and 83, the timing relay contacts 78—79, the holding relay contacts 72—73, and the parallel connected coil 71 and motor 77 to the other energizing conductor 89.

It should be apparent from the foregoing that the relay 64 is operatively energized to open the reference signal decreasing circuit of the motor 41 for the hold-out period only if the galvanometer contact 81 engages the contact 83 within the time delay relay drop-out period following the disengagement of the contact 81 from the contact 82, such action of the contact 81 being indicative of a potential hunting condition and a need for so preventing the decrease of the reference signal.

When the present hold-out period maintained by the timing relay 65 has expired, during which period the plant cost conditions which caused the hunting tendency presumably have disappeared, the contacts 78—79 open, thereby breaking the sealing circuit for the relay 64. This causes the coil 71 and the motor 77 to be deenergized and the contacts 72—73 to open, which in turn causes the coil 71 and the motor 77 to remain deenergized, even upon the reclosing of the contacts 78—79 which occurs shortly after the motor 77 is deenergized. There is no energizing circuit for the relays 64 and 65 through the contacts 67—68 at this time, since the relay 63 has been deenergized for some time.

The deenergization of the relay 64 also causes the contacts 74—75 to close, thereby restoring the energizing circuit for the motor winding 85. Thus, at the expiration of the hold-out period, the anti-hunting arrangement is returned to the normal condition shown in Fig. 4.

The over-all result of the foregoing operation is that the simultaneous energization of more raising relays than warranted by the magnitude of the deviation prevents the reference signal from being reduced for a set hold-out period, such as fifteen seconds. Additional plants may be added to receive raising impulses during this period, if the conditions require it, since the circuit for the motor winding 84 can be established at any time by the closing of the galvanometer contacts 81 and 82. Such action also prematurely terminates the hold-out period, due to the resulting deenergization of the relays 64 and 65 which occurs upon the opening of the galvanometer contacts 81 and 83.

However, no plants can be removed from receiving raising impulses until the hold-out period has elapsed or is prematurely terminated as just described. Such termination, resulting from the opening of the galvanometer contacts 81 and 83, could result from an increase in the deviation, requiring more plants to be connected to receive raising impulses, or from an increase in the cost of a selected plant which results in the plant cost signal exceeding the existing value of the reference signal.

In all cases, therefore, the presence of the Fig. 4 arrangement prevents the aforementioned oscillatory swings in the balancing and reference signals which would constitute a hunting condition and affect the stability of operation of the system.

When an arrangement of the type shown in Fig. 4 is employed with the motor 41' and galvanometer 39' in the portion 17, the operation with respect to preventing plants from being dropped from receiving lowering impulses during the hold-out period is the same as that described above for the Fig. 4 arrangement with respect to raising impulses, as should be readily apparent.

THE MODIFICATION OF FIG. 5

Figure 5:
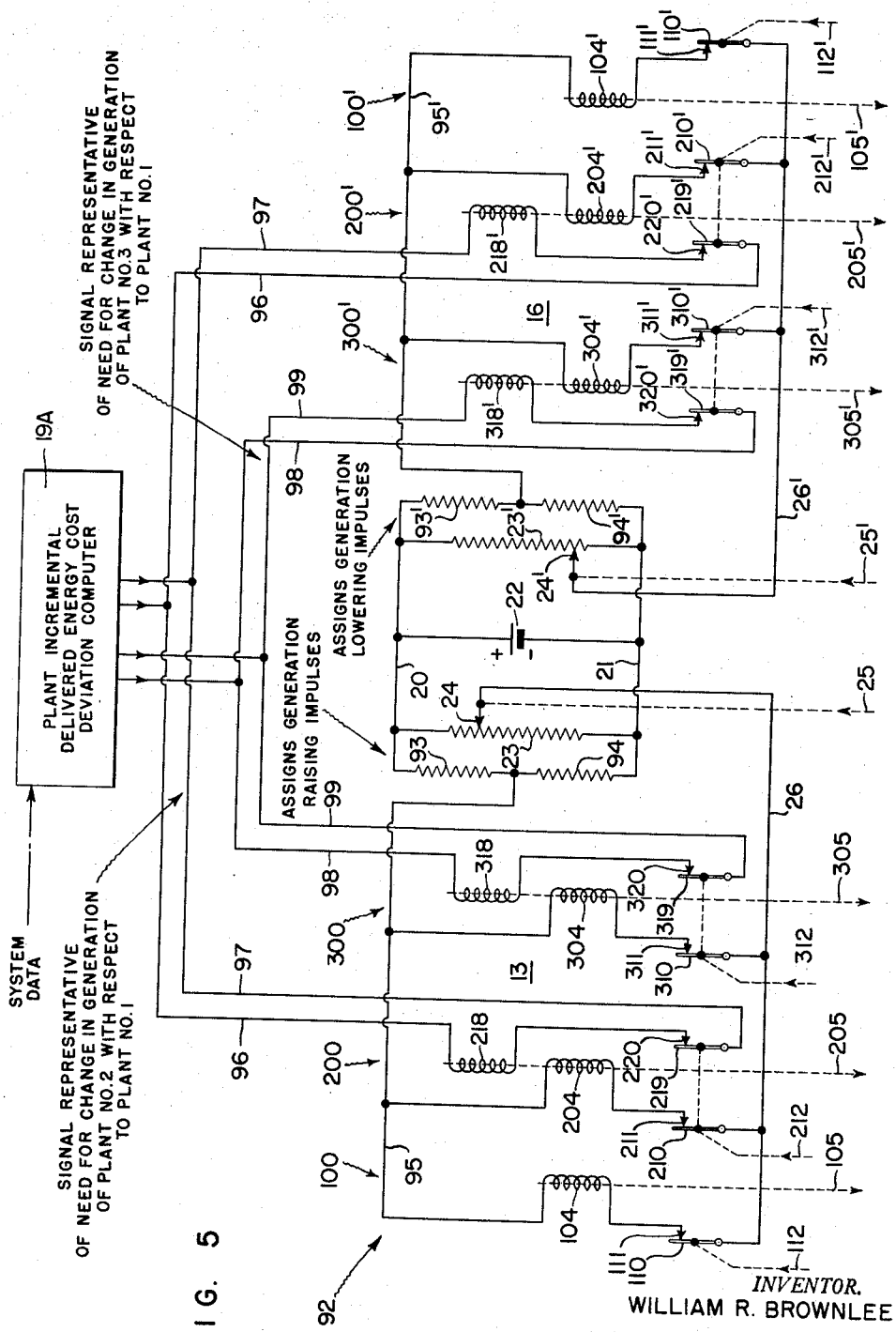
Fig. 5 is a schematic circuit diagram of a modification according to the invention of the plant selecting section of the Fig. 1 apparatus.

In Fig. 5 there is shown an economic plant selecting section 92 for the Fig. 1 apparatus which is a modification of the corresponding section 10 previously described. The section 92 differs primarily from the section 10 by being constructed and arranged to receive plant cost data which is in the form of cost deviation or difference voltages or signals, supplied by a computer 19A, instead of being in the form of cost slidewire contact positioning adjustments as is the cost data to which the section 10 is responsive. Accordingly, the section 92 is useful, and is arranged for use, in those applications where the plant cost computer supplies the plant cost data in the form of such signals, as occurs, for example, when the computer is of the form of the apparatus disclosed and claimed in my aforementioned copending application. As in the previous descriptions, the term plant cost is used herein to denote the plant incremental delivered energy cost.

Aside from being responsive to plant cost data supplied to it in a different form, the section 92 does not differ essentially from the section 10, and operates in the same manner with respect to the sections 11 or 60 and the section 12 as does the section 10. Thus, the section 92 can be employed in the Fig. 1 apparatus in place of the section 10 in those applications where such substitution is made desirable or necessary by the nature of the plant cost computer and the plant cost data furnished thereby. It should be noted in this connection that the section 92 can be so used in the Fig. 1 apparatus no matter whether the latter includes the section 11 or the section 60, or whether or not the arrangement of Fig. 4 is utilized.

Due to the above noted difference in the form of the plant cost data to which the sections 10 and 92 are arranged to respond, the specific construction and operation of the section 92 differs somewhat from those of the section 10 as previously described. Specifically, the section 92 does not include the cost slide wire resistors of the section 10, but instead includes additional coils, referred to herein as cost coils, on certain of the raising and lowering relays. These cost coils take the place of the cost resistors in causing the raising and lowering relays to be biased in accordance with the relative costs of the corresponding plants.

Considering the Plant 2 component group 200 in the raising portion 13 of the section 92 by way of example, it is seen that the Plant 2 raising relay includes a cost coil 218 in addition to the coil 204, referred to hereinafter as a reference coil of the relay. This relay is a two-coil, voltage responsive, polarized electromagnetic relay, and is arranged to close the sets of contacts 206—207 and 208—209 in the other sections of the apparatus, through the linkage 205, whenever the algebraic sum of the voltages or signals across the coils 204 and 218 becomes equal to the pick-up value for the relay. For the following description, it will be assumed that this relay is so constructed and polarized that its contacts do not close until and unless the algebraic sum or resultant of the potential of the bottom of the reference coil 204 with respect to the top thereof and the potential of the bottom of the cost coil 218 with respect to the top thereof is positive by the amount of the pick-up value. In other words, the relay becomes operatively energized and picks up when the potentials or voltages across the two coils 204 and 218 amount to a net positive resultant potential on the coil bottoms equal to the pick-up value.

For example, if it is assumed that the relay pick-up voltage has a value of three volts, and that a voltage across the cost coil 218 makes the potential of the bottom thereof six volts negative with respect to the top, the potential of the bottom of the reference coil 204 must be made at least nine volts positive with respect to the top in order that the net coil bottom potential be made the three volts positive necessary to cause the relay to pick up.

The Plant 3 raising relay in the group 300 also includes a cost coil 318 as well as its reference coil 304, and operates in the same manner as the raising relay for Plant 2 as just described. Similarly, the lowering relay for Plant 2 in the group 200' of the lowering portion 16 has a cost coil 218' cooperating with its reference coil 204'. Finally, the lowering relay for Plant 3 has a cost coil 318' cooperating with its reference coil 304'.

The raising and lowering relays for Plant 1, however, do not include any cost coils, and hence are identical to the corresponding relays included in the section 10. The reason for this is that the plant costs represented by the cost signals supplied to the apparatus for Plants 2 and 3 are computed relative to the cost for Plant 1, as will be discussed further hereinafter.

As for the section 10 the raising reference signal slide wire resistor 23 of the section 92 is connected between and energized from the energizing conductors 20 and 21. Also connected in series between these two conductors are two resistors 93 and 94. The raising reference signal for the section 92 is produced between the reference contact 24, and hence the reference conductor 26, and a datum conductor 95 which is connected to the junction between the resistors 93 and 94. Accordingly, when the contact 24 is at the lower limit of its travel on the resistor 23, the reference potential or signal on the conductor 26 has its maximum negative value with respect to the datum conductor 95. Further, as the linkage 25 raises the contact 24 as described hereinbefore, this reference signal on the conductor 26 becomes less and less negative, passes through zero, and then becomes increasingly positive, reaching its maximum positive value when the contact 24 reaches its upper limit of travel. Thus, the progressive upward movement of the contact 24 causes the reference signal on the conductor 26 to increase progressively in the positive direction.

The reference coils 104, 204, and 304 of the three raising relays are all connected in parallel with each other between the reference conductors 26 and 95. As before, the connection to each of these coils includes the corresponding set of high limit interlock contacts 110, 111, etc.

The reference coils 104', 204', and 304' of the three lowering relays are also connected in parallel with each other between their lowering reference signal conductors 26' and 95', through their corresponding low limit interlock contacts 110', 111', etc. The remainder of the portion 16 is connected and arranged in the same manner as the portion 13 as just described.

The cost coil 218 of the Plant 2 raising relay is energized with a Plant 2 cost signal from the cost computer 19A. This signal is produced by the computer 19A between conductors 96 and 97. Accordingly, the top of the cost coil 218 is connected directly to the conductor 96, while the bottom of this coil is connected through additional high limit interlock contacts 219—220 to the conductor 97. The interlock contacts 219—220 are ganged with the similar contacts 210—211 to the linkage 212 and hence serve to disconnect the coil 218, along with the coil 204, upon Plant 2 reaching its upper limit of generation.

The cost signal produced by the computer 19A between the conductors 96 and 97 is actually a cost deviation or difference signal, as mentioned hereinbefore. Specifically, this cost signal has a magnitude which is a function of the difference between the existing costs for Plants 1 and 2, or of the cost of Plant 2 relative to that of Plant 1. Also, the polarity of this cost signal is dependent upon whether the existing cost for Plant 2 is greater or less than that for Plant 1. Accordingly, the magnitude of this cost signal is also representative of the extent to which the generation of Plant 2 should be changed in order to bring the cost for Plant 2 into equality with the existing cost for Plant 1, and the polarity of this cost signal also indicates whether this generation should be increased or decreased with respect to Plant 1. When the existing costs for Plants 1 and 2 are equal, this cost signal is substantially zero. Plant 1 is thus treated as a reference plant with respect to Plants 2 and 3.

For the purposes of the following description, it will be assumed herein that the cost signal for Plant 2 is such that the conductor 97 has its highest positive value with respect to the conductor 96 when the cost for Plant 2 has the lowest possible value with respect to Plant 1. Conversely, the conductor 97 has its highest negative value with respect to the conductor 96 when the cost for Plant 2 has the highest possible value with respect to Plant 1. Thus, the lower the cost of Plant 2 relative to Plant 1, the more positive the bottom of the cost coil 218 will be with respect to its top, and the shorter the distance that the contact 24 will have to rise before the decreasing negative reference signal on the conductor 26, which is actually increasing in the positive direction, no longer prevents the cost coil signal from causing the Plant 2 raising relay to pick up. Similarly, the higher the cost for Plant 2 with respect to Plant 1, the more negative the bottom of the cost coil 218 will be with respect to its top, and the longer the distance that the contact 24 will have to rise before the increasing positive reference signal on the conductor 26 can overcome the cost coil signal and cause the Plant 2 raising relay to pick up.

The Plant 2 cost signal conductors 96 and 97 are also connected to the lowering relay cost coil 218', but in the reverse manner. Thus, the conductor 96, which is positive when the cost for Plant 2 is higher than the cost for Plant 1, is connected through a set of low limit interlock contacts 219'—220' to the bottom of the coil 218', while the top of the latter is connected directly to the conductor 97. Accordingly, the higher the cost of Plant 2 with respect to Plant 1, the more positive the bottom of the cost coil 218' will be with respect to its top, and the shorter the distance that the contact 24' will have to rise before the decreasing negative reference signal on the conductor 26' no longer prevents the cost coil signal from causing the Plant 2 lowering relay to pick up. Similarly, the lower the cost for Plant 2 with respect to Plant 1, the more negative the bottom of the cost coil 218' will be with respect to its top, and the longer the distance that the contact 24' will have to rise before the increasing positive reference signal on the conductor 26' can overcome the cost coil signal and cause the Plant 2 lowering relay to pick up.

The foregoing may be conveniently summarized as follows. When Plant 2 is a low cost plant with respect to Plant 1, conductor 97 is positive with respect to conductor 96, the bottom of the raising relay cost coil 218 is positive, and the bottom of the lowering relay cost coil 218' is negative. As a result, the raising relay of cheaper Plant 2 will be picked up by the positively increasing raising reference signal on the conductor 26 before the latter signal picks up the raising relay of a more expensive plant, such as Plant 1. Moreover, the lowering relay of a more expensive plant, such as Plant 1, will be picked up by the positively increasing lowering reference signal on the conductor 26' before the latter signal picks up the lowering relay of cheaper Plant 2.

Conversely, when Plant 2 has a higher cost than Plant 1, conductor 96 is positive with respect to conductor 97, the bottom of the raising relay cost coil 218 is negative, and the bottom of the lowering relay cost coil 218' is positive. Accordingly, the raising relay of a cheaper plant, such as Plant 1, will be picked up before the raising relay of the more expensive Plant 2 is picked up. Similarly, the lowering relay of the more expensive Plant 2 will be picked up before the lowering relay of a cheaper plant, such as Plant 1, is picked up.

The cost signal for Plant 3 is produced by the computer 19A between conductors 98 and 99, and is such that the conductor 99 is positive with respect to the conductor 98 when Plant 3 has a lower cost than Plant 1, while the conductor 99 is negative with respect to the conductor 98 when Plant 3 has a higher cost than Plant 1. The conductor 98 is connected to the top of the raising relay cost coil 318 and to the bottom of the lowering relay cost coil 318', while the conductor 99 is connected to the bottom of the coil 318 and to the top of the coil 318'. As a result, the raising and lowering relays for Plant 3 are selected by the corresponding reference signals in accordance with the magnitude and polarity of the Plant 3 cost signal in the same manner as for Plant 2 as just described.

As before, it is necessary that the values of the two cost signals be related in accordance with the relative costs of Plants 2 and 3 in order that the increasing reference signals can select the plants in the order of their costs. This occurs in the case of the Fig. 5 apparatus as a result of each cost signal representing the cost of its plant relative to a common value, namely, the cost for Plant 1.

OPERATION OF THE FIG. 5 ARRANGEMENT

As a result of the foregoing construction and relationships, the raising portion 13 of the Fig. 5 apparatus selects the plants in the order of their increasing costs in choosing which plants are to have their raising relays operatively energized and hence are to receive raising impulses. For example, if Plant 2 is a lower cost plant with respect to Plant 1 while Plant 3 is a higher cost plant with respect to Plant 1 at a given time, Plant 2 will be the lowest cost plant and will be selected first, Plant 1 will be the next higher cost plant and will be selected next, and Plant 3 will be the highest cost plant and will be selected last. Or, as another example, if Plant 3 also has a lower cost than Plant 1, but one which is not as low as Plant 2, Plant 2 will be the lowest cost and first selected plant, Plant 3 will be the next higher cost and next selected plant, and Plant 1 will be the highest cost and last selected plant. In each case, the lowest cost plant, and the first one to be selected, will be the one whose raising relay cost coil bottom potential is the most positive or the least negative. This results from the fact that, upon the progressive upward movement of the contact 24, the raising reference signal or potential on the bottoms of the relay reference coils progressively increases in the positive direction, and hence causes the operative energization of the raising relays in the order of the decreasing positive potentials on the bottoms of their cost coils. For the purposes of the foregoing two statements, it is considered that the relay for Plant 1 has a cost coil which always has zero voltage across it.

Similarly, the lowering portion 16 of the Fig. 5 apparatus selects the plants in the order of their decreasing costs in choosing which plants are to have their lowering relays operatively energized and hence are to receive lowering impulses. In each case, the highest cost plant, and the first one to be selected to receive lowering impulses, will be the one whose lowering relay cost coil bottom potential is the most positive or the least negative. This operation is the same as that just described for the raising portion 13, since the bottoms of the raising and lowering cost coils for a given plant are caused to have opposite polarities for a given cost signal, as explained above.

A single example of the typical operation of the section 92 will suffice to complete the present description. For this purpose, let it be assumed that the cost for Plant 2 is less than that for Plant 1 and that the cost for Plant 3 is greater than that for Plant 1. As a result, the cost signal for Plant 2 makes the conductor 97 and the bottom of the cost coil 218 positive to an extent which is a function of the magnitude of the difference between the cost for Plant 2 and the cost for Plant 1. Similarly, the cost signal for Plant 3 makes the conductor 99 and the bottom of the cost coil 318 negative to an extent which is a function of the magnitude of the difference between the cost for Plant 3 and the cost for Plant 1.

Let it also be assumed that the reference contact 24 is at or near its lower limit of travel, and that the resulting reference signal on the conductor 26 makes the bottoms of the reference coils 104, 204, and 304 sufficiently negative to cause all of the raising relays to be dropped out.

Assuming now that a negative schedule deviation occurs requiring that all three plants be connected to receive raising impulses, the contact 24 begins its progressive upward movement, and the reference signal begins its increase in the positive direction. No raising relay becomes operatively energized, however, until the increasing reference signal on the reference coils makes the net positive coil bottom potential of one of these relays exceed the pick-up value.

As the reference signal increases, the first relay to be so energized is that for the lowest cost Plant 2. This relay is the first to pick up because the positive potential of the bottom of its cost coil 218 makes it the first raising relay to have a net positive coil bottom potential equal to the pick-up value in the presence of the positively increasing potential on the bottom of its reference coil 204.

The next raising relay to become operatively energized is the one for the next higher cost Plant 1. This relay picks up as the increasing reference signal reaches a value which makes the bottom potential of the coil 104 positive by the amount of the pick-up value. It is apparent that this requires a more positive reference signal than that which caused the Plant 2 relay to pick up, since the Plant 1 relay does not have the positive cost coil potential which the Plant 2 relay has to aid it in reaching the pick-up value.

Subsequently, when the reference signal has increased to a still more positive value, the relay for the highest cost plant 3 picks up. This occurs at the reference signal value which causes the potential on the bottom of the coil 304 to be sufficiently positive to overcome the negative potential on the bottom of the coil 318 by the amount of the pick-up value. It is apparent that this requires a more positive reference signal than that which caused the Plant 1 relay to pick-up, since the latter does not have the negative cost coil potential to be overcome by the reference coil potential before the pick-up value can be reached.

The description just given applies as well to the portion 16 upon the occurrence of a positive schedule deviation. In that portion, the increasing reference signal on the conductor 26′ first causes the operative energization of the lowering relay for the highest cost Plant 3. This is the first lowering relay to pick up, since its cost coil 318′ has a positive bottom potential, corresponding to the positive potential on the conductor 98 and to the aforementioned negative potential on the conductor 99 and the bottom of the coil 318, which makes the Plant 3 lowering relay the first lowering relay to have a net positive coil bottom potential equal to the pick up value. This is followed by the operative energization of the lowering relay for the next lower cost Plant 1, and finally by the operative energization of the lowering relay for the lowest cost Plant 2, as the reference signal continues to increase.

It should be clear that the foregoing operation of the Fig. 5 section 92 provides an order of plant selection which results in an economical division of the system generation among the system plants, as is desired.

ADDITIONAL CONSIDERATIONS

The apparatus described herein can readily be adapted to assign the loads to manually dispatched and controlled plants forming a part of a system of the type herein referred to. Such manually operated plants would be provided with individual raising and lowering relays which would have the same type of coil connections as the relays described herein for the automatically controlled plants, but which would not include any rebalancing or impulse connecting contacts. Instead, each manual plant relay would be provided with suitable contacts to light an appropriate signal lamp when the relay became operatively energized. Accordingly, when the relay for a manual plant would be selected for pick-up by the apparatus because of the cost of the corresponding plant, the appropriate signal lamp would be lighted, and the selecting apparatus would pass on to select the next automatic plant, in order of cost, as necessary to balance the deviation. A manual change in the generation of the corresponding manual plant with the lighted signal lamp would then be ordered, the direction of this change being dictated by whether it was the raising or the lowering signal lamp for the plant which was lighted. Such ordered manual generation changes would be repeated periodically until the lighted signal lamp became extinguished.

CONCLUSION

It should be readily apparent from the foregoing that there has been provided novel apparatus for automatically controlling the generation of the plants of an electric power system as necessary to cause the system to operate in the most economical manner under the existing system conditions. Such control is effected by assigning to the plants the control impulses needed to cause the system to meet its scheduled requirements, the order of this assignment being based on the incremental delivered energy costs for the plants so as to cause the scheduled requirements to be met in the most economical manner.

It has also been shown that the disclosed apparatus provides for the assignment of automatic raising or lowering control impulses to only one, to a few, or to all of the available plants of a system, depending upon the degree of the system schedule deviation. As a result, the number of plants under simultaneous control is proportioned according to the system need for such control, whereby such deviation is corrected in a rapid but stable manner.

What is claimed is:

1. Apparatus for assigning the loads to the interconnected generating plants of a power system as required to cause the scheduled requirements of the system to be met in the most economical manner, comprising first means responsive to deviation between the existing and scheduled values of the system conditions of a sense requiring an increase in the system generation for selecting one or more of said plants in the ascending order of their relative incremental delivered energy costs, second means for assigning to each plant selected by said first means a plant output-increasing control effect, third means responsive to deviation between the existing and scheduled values of the system conditions of a sense requiring a decrease in the system generation for selecting one or more of said plants in the descending order of their relative incremental delivered energy costs, fourth means for assigning to each plant selected by said third means a plant output-decreasing control effect, and means included in said first and third means to make the number of plants so selected at any given time a function of the extent of the existing one of said deviations, whereby the loads are assigned to said plants as required to meet the scheduled system requirements in the most economical manner.

2. Apparatus as specified in claim 1, wherein there are included means arranged to prevent a plant whose output has reached a predetermined maximum value from being selected to receive said output-increasing control effect, and means arranged to prevent a plant whose output has reached a predetermined minimum value from being selected to receive said output-decreasing control effect.

3. Apparatus for assigning the loads to the interconnected generating plants of a power system as required to cause the scheduled requirements of the system to be met in the most economical manner, comprising first means responsive to deviation between the existing and scheduled values of the system conditions for producing a reference effect, second means responsive to said reference effect for selecting a number of said plants which is related to the extent of said deviation, said second means including means arranged to effect comparisons between said reference effect and plant relative incremental delivered energy cost effects to cause said selection to be made in the order of the relative incremental delivered energy costs for said plants, and third means responsive to said selection effected by said second means for assigning to each selected plant a plant output-changing control effect of a sense to reduce said deviation, whereby the loads are assigned to said plants as required to meet the scheduled system requirements in the most economical manner.

4. Apparatus for assigning the loads to the interconnected generating plants of a power system as required to cause the scheduled requirements of the system to be met in the most economical manner, comprising first means responsive to deviation between the existing and scheduled values of the system conditions for producing a first reference effect in the presence of negative schedule deviation requiring for its reduction an increase in the system generation, and for producing a second reference effect in the presence of positive schedule deviation requiring for its reduction a decrease in the system generation, second means having a first portion responsive to said first reference effect for selecting a number of said plants which is a function of the extent of said negative deviation, said first portion including means arranged to effect comparisons between said first reference effect and plant relative incremental delivered energy cost effects to cause said selection to be made in the ascending order of the relative incremental delivered energy costs for said plants, said second means also having a second portion responsive to said second reference effect for selecting a number of said plants which is a function of the extent of said positive deviation, said second portion including means arranged to effect comparisons between said second reference effect and said cost effects to cause the last mentioned selection to be made in the descending order of the relative incremental delivered energy costs for said plants, and third means for assigning to each plant selected by said first portion a plant output-increasing control effect, and for assigning to each plant selected by said second portion a plant output-decreasing control effect, whereby the loads are assigned to said plants as required to meet the scheduled system requirements in the most economical manner.

5. Apparatus for assigning the loads to the interconnected generating plants of a power system as required to cause the scheduled requirements of the system to be met in the most economical manner, comprising first means responsive to an effect representative of deviation between the existing and scheduled values of the system conditions for producing a reference effect resulting from said deviation, second means responsive to said reference effect for selecting a number of said plants which is related to the extent of said deviation, said second means including means arranged to effect comparisons between said reference effect and cost effects representative of the relative incremental delivered energy costs for said plants and to effect said selection on the basis of said comparisons and hence in the order of said relative incremental delivered energy costs, and third means responsive to said selection effected by said second means for assigning to each selected plant a plant output-changing control effect of a sense to reduce said deviation, whereby the loads are assigned to said plants as required to meet the scheduled system requirements in the most economical manner.

6. Apparatus for assigning the loads to the interconnected generating plants of a power system as required to cause the scheduled requirements of the system to be met in the most economical manner, comprising first means responsive to an effect representative of deviation between the existing and scheduled values of the system conditions for producing a reference effect resulting from said deviation, second means responsive to said reference effect for effecting comparisons between said reference effect and a plurality of cost effects, each of which is representative of the relative incremental delivered energy cost for a corresponding one of said plants, and for selecting one or more of said plants on the basis of said comparisons and hence in the order of said relative incremental delivered energy costs, means included in said first means and responsive to the selection of said plants by said second means for controlling said reference effect to maintain the number of selected plants proportional to the extent of said deviation, and third means responsive to said selection effected by said second means for assigning to each selected plant a plant output-changing control effect of a sense to reduce said deviation, whereby the loads are assigned to said plants as required to meet the scheduled system requirements in the most economical manner.

7. Apparatus for assigning the loads to the interconnected generating plants of a power system as required to cause the scheduled requirements of the system to be met in the most economical manner, comprising first means for producing a reference effect of progressively increasing value upon the occurrence of deviation between the existing and scheduled values of the system conditions, second means for comparing said reference effect to a plurality of cost effects, each of which is representative of the relative incremental delivered energy cost for a corresponding one of said plants, said second means including a device individual to each of said plants which is actuated to select the corresponding plant upon the value of said reference effect exceeding the value of the corresponding one of said cost effects by a predetermined amount, means interconnecting said first and second means for terminating the increase in the value of said reference effect upon the number of plants so selected becoming proportional to the extent of said deviation, and for subsequently changing the value of said reference effect upon variation in the extent of said deviation to maintain the number of selected plants proportional to the existing extent of said deviation, and third means responsive to the actuation of said devices for assigning to each selected plant a plant output-changing control effect of a sense to eliminate said deviation, whereby the loads are assigned to said plants as required to meet the scheduled system requirements in the most economical manner.

8. Apparatus for assigning the loads to the interconnected generating plants of a power system as required to cause the scheduled requirements of the system to be met in the most economical manner, comprising first means responsive to an effect representative of deviation between the existing and scheduled values of the system conditions for producing a reference signal of a value which starts to increase progressively upon the occurrence of said deviation, second means for effecting comparisons between the value of said reference signal and the values of a plurality of cost signals, each of the last mentioned values being representative of the existing relative incremental delivered energy cost for a corresponding one of said plants, means included in said second means for selecting the corresponding one of said plants as the increasing value of said reference signal exceeds the value of the corresponding one of said cost signals by a predetermined amount, whereby said second means effects said selection of said plants in the order of their relative incremental delivered energy costs, means included in said first means and responsive to said plant selection effected by said second means for terminating said increase in the value of said reference signal upon the number of plants so selected becoming proportional to the extent of said deviation, and for subsequently changing the value of said reference signal upon variation in the extent of said deviation to maintain the number of selected plants proportional to the existing extent of said deviation, and third means responsive to said selection effected by said second means for assigning to each selected plant a plant output-changing control effect of a sense to reduce said deviation, whereby the loads are assigned to said plants as required to meet the scheduled system requirements in the most economical manner.

9. Apparatus for assigning the loads to the interconnected generating plants of a power system as required to cause the scheduled requirements of the system to be met in the most economical manner, comprising first means for producing a deviation signal of a value representative of the extent of deviation between the existing and scheduled values of the system conditions, second means for producing a reference signal, comparison means for comparing the value of said reference signal to the values of a plurality of cost signals, each of the last mentioned values being representative of the existing relative incremental delivered energy cost for a corresponding one of said plants, said comparison means including a device which is individual to each of said plants and which is energized to select the corresponding plant when the value of said reference signal and the value of the corresponding cost signal have a predetermined relationship, adjusting means responsive to the number of said devices energized at any given time and to the value of said deviation signal for progressively changing the value of said reference signal to maintain said number of energized devices proportional to the extent of said deviation, and third means responsive to the energization of said devices for assigning to each selected plant a plant output-changing control effect of a sense to reduce said deviation, whereby the loads are assigned to said plants as required to meet the scheduled system requirements in the most economical manner.

10. Apparatus for assigning the loads to the interconnected generating plants of a power system as required to cause the scheduled requirements of the system to be met in the most economical manner, comprising first means responsive to deviation between the existing and scheduled values of the system conditions for producing a first deviation signal of a value representative of the extent of negative schedule deviation requiring for its reduction an increase in the system generation, and for producing a second deviation signal of a value representative of the extent of positive schedule deviation requiring for its reduction a decrease in the system generation, second means for producing first and second reference signals respectively individual to said first and second deviation signals, a first and a second device individual to each of said plants, each of said devices being biased in accordance with the relative incremental delivered energy cost for the corresponding one of said plants, means applying said first reference signal to all of said first devices, means applying said second reference signal to all of said second devices, each of said devices being operatively energized to select the corresponding one of said plants when the value of the corresponding one of said reference signals overcomes said cost bias on that device, first adjusting means responsive to the number of said first devices operatively energized at any given time and to the concurrent value of said first deviation signal for progressively changing the value of said first reference signal to maintain said number of operatively energized first devices proportional to the extent of said negative deviation, whereby said first devices are operatively energized in the ascending order of their corresponding plant costs and are operatively deenergized in the descending order of said costs as the value of said first reference signal is changed in one direction or the other, respectively, second adjusting means responsive to the number of said second devices operatively energized at any given time and to the concurrent value of said second deviation signal for progressively changing the value of said second reference signal to maintain said number of operatively energized second devices proportional to the extent of said positive deviation, whereby said second devices are operatively energized in the descending order of said costs and are operatively deenergized in the ascending order of said costs as the value of said second reference signal is changed in one direction or the other, respectively, and third means for assigning a plant output-increasing control effect to each plant having its said first device operatively energized, and for assigning a plant output-decreasing control effect to each plant having its said second device operatively energized, whereby the loads are assigned to said plants as required to meet the scheduled system requirements in the most economical manner.

11. Apparatus as specified in claim 10, wherein there are included means for positively preventing the operative energization of the one of said first devices for a plant whose output has reached a predetermined maximum value, and means for positively preventing the operative energization of the one of said second devices for a plant whose output has reached a predetermined minimum value.

12. Apparatus for assigning the loads to the interconnected generating plants of a power system as required to cause the scheduled requirements of the system to be met in the most economical manner, comprising first means for producing a deviation signal of a value representative of the extent of deviation between the existing and scheduled values of the system conditions, second means for producing a reference signal, balancing means for producing a balancing signal in opposition to said deviation signal, adjusting means responsive to said opposed balancing and deviation signals for progressively increasing the value of said reference signal as long as said deviation signal exceeds said balancing signal by at least a predetermined amount, comparison means for comparing the value of said reference signal to the values of a plurality of cost signals, each of the last mentioned values being representative of the existing relative incremental delivered energy cost for a corresponding one of said plants, said comparison means including a device which is individual to each of said plants and which is energized to select the corresponding plant upon the value of said reference signal exceeding the value of the corresponding one of said cost signals by a predetermined amount, connections between said devices and said balancing means for increasing the value of said balancing signal upon the successive energization of said devices, whereby the value of said reference signal increases until the number of plants so selected becomes proportional to the extent of said deviation and causes said balancing signal to balance said deviation signal and terminate the increase in the value of said reference signal, said adjusting means being arranged upon a decrease in said deviation signal below said balancing signal to progressively decrease the value of said reference signal and hence to cause the successive deenergization of said devices until the resultant decrease in the value of said balancing signal causes the latter to balance said decreased deviation signal, and third means responsive to the energization of said devices for assigning to each of said plants, while selected, a plant output-changing control effect of a sense to reduce said deviation, whereby the loads are assigned to said plants as required to meet the scheduled system requirements in the most economical manner.

13. Apparatus for assigning control impulses to the interconnected generating plants of a power system to change the plant generation as required to cause the scheduled requirements of the system to be met in the most economical manner, comprising means responsive to deviation between the existing and scheduled values of the system conditions for selecting one or more of said plants in the order of their relative incremental delivered energy costs, said means including means arranged to make the number of plants so selected a function of the extent of said deviation, and other means responsive to the selection effected by the first mentioned means for assigning, to each selected plant, plant generation changing control impulses of a sense to eliminate said deviation.

14. Apparatus for assigning control impulses to the interconnected generating plants of a power system to change the plant generation as required to cause the scheduled requirements of the system to be met in the most economical manner, comprising first means responsive to an effect representative of any deviation between the existing and scheduled values of the system conditions for producing a reference effect resulting from said deviation, second means responsive to said reference effect for selecting a number of said plants which is related to the extent of said deviation, said second means being arranged to compare said reference effect to cost effects representative of the relative incremental delivered energy costs of said plants and to effect said selection on the basis of said comparisons and hence in the order of said relative incremental delivered energy costs, and third means responsive to the selection effected by said second means for assigning, to each selected plant, plant generation changing control impulses of a sense to eliminate said deviation.

15. Apparatus for assigning control impulses to the interconnected generating plants of a power system to change the plant generation as required to cause the scheduled requirements of the system to be met in the most economical manner, comprising conductors adapted to supply to said apparatus plant generation raising control impulses and plant generation lowering control impulses, first means responsive to deviation between the existing and scheduled values of the system conditions for producing a raising reference effect in the presence of negative schedule deviation requiring for its reduction an increase in the system generation, and for producing a lowering reference effect in the presence of positive schedule deviation requiring for its reduction a decrease in the system generation, second means having a raising portion responsive to said raising reference effect for selecting a number of said plants to receive said generation raising impulses, said raising portion including means arranged to make said number a function of the extent of said negative deviation, and also including means arranged to effect comparisons between said raising reference effect and plant relative incremental delivered energy cost effects to cause said selection to be made in the ascending order of the relative incremental delivered energy costs for said plants, said second means also having a lowering portion responsive to said lowering reference signal for selecting a number of said plants to receive said generation lowering impulses, said lowering portion including means arranged to make the last mentioned number a function of the extent of said positive deviation, and also including means arranged to effect comparisons between said lowering reference effect and said cost effects to cause the last mentioned selection to be made in the descending order of the relative incremental delivered energy costs of said plants, and third means for assigning said generation raising impulses to each plant selected by said raising portion, and for assigning said generation lowering impulses to each plant selected by said lowering portion.

16. Apparatus as specified in claim 15, wherein said conductors supply said raising impulses to said apparatus only upon the existence of said negative schedule deviation, and wherein said conductors supply said lowering impulses to said apparatus only upon the existence of said positive schedule deviation.

17. Apparatus as specified in claim 16, wherein each of said impulses has a duration which is proportional to the extent of the corresponding schedule deviation.

18. Apparatus for assigning control impulses to the interconnected generating plants of a power system to change the plant generation as required to cause the scheduled requirements of the system to be met in the most economical manner, comprising conductors adapted to supply to said apparatus plant generation raising control impulses and plant generation lowering control impulses, first means responsive to deviation between the existing and scheduled values of the system conditions for producing a negative deviation signal of a value representative of the extent of negative schedule deviation requiring for its reduction an increase in the system generation, and for producing a positive deviation signal of a value representative of the extent of positive schedule deviation requiring for its reduction a decrease in the system generation, second means for producing raising and lowering reference signals respectively individual to said negative and positive deviation signals, a raising impulse assigning and a lowering impulse assigning device individual to each of said plants, each of said devices being biased in accordance with the relative incremental delivered energy cost for the corresponding one of said plants, means applying said raising reference signal to all of said raising devices, means applying said lowering reference signal to all of said lowering devices, each of said devices being operatively energized to select the corresponding one of said plants to receive the corresponding type of said impulses when the value of the corresponding one of said reference signals overcomes said cost bias on that device, first adjusting means responsive to the number of said raising devices operatively energized at any given time and to the concurrent value of said negative deviation signal for progressively changing the value of said raising reference signal to maintain said number of operatively energized raising devices proportional to the extent of said negative deviation, whereby said raising devices are operatively energized in the ascending order of their corresponding plant costs and are operatively deenergized in the descending order of said costs as the value of said raising reference signal is changed in one direction or the other, respectively, second adjusting means responsive to the number of said lowering devices operatively energized at any given time and to the concurrent value of said positive deviation signal for progressively changing the value of said lowering reference signal to maintain said number of operatively energized lowering devices proportional to the extent of said positive deviation, whereby said lowering devices are operatively energized in the descending order of said costs and are operatively deenergized in the ascending order of said costs as the value of said lowering reference signal is changed in one direction or the other, respectively, and third means for assigning said generation raising impulses to each plant having its said raising device operatively energized, and for assigning said generation lowering impulses to each plant having its said lowering device operatively energized.

19. Apparatus for assigning the loads to the interconnected generating plants of a power system as required to cause the scheduled requirements of the system to be met in the most economical manner, comprising a separate signal responsive device individual to each of said plants, a reference conductor adapted to have a reference signal thereon, first means connecting said reference conductor to each of said devices for applying said reference signal thereto, second means adapted to apply to each of said devices a cost signal of a value representative of the relative incremental delivered energy cost for the corresponding one of said plants, each of said devices being arranged to be operatively energized when the values of said reference signal and the corresponding one of said cost signals applied thereto attain a predetermined relationship, third means for varying the value of said reference signal to maintain the number of operatively energized ones of said devices in proportion to the extent of deviation between the existing and scheduled values of the system conditions, whereby said devices are operatively energized and deenergized in the order of their corresponding plant costs as the value of said reference signal is changed in one direction or the other, respectively, and fourth means for assigning a plant output-changing control effect to each plant having the corresponding one of said devices operatively energized, whereby the loads are assigned to said plants as required to meet the scheduled system requirements in the most economical manner.

20. Apparatus as specified in claim 19, wherein said second means includes a separate adjustable resistor contact individual to each of said plants and adapted to be adjusted in accordance with the relative incremental delivered energy cost for the corresponding one of said plants, and wherein each of said devices is connected between said reference conductor and the corresponding one of said contacts and is responsive to the difference between the values of said reference signal and the corresponding one of said cost signals.

21. Apparatus as specified in claim 20, wherein each of said devices is an electromagnetic relay having an operating winding connected between said reference conductor and the corresponding one of said contacts.

22. Apparatus as specified in claim 19, wherein said third means includes deviation means for producing a deviation signal of a value representative of the extent of said deviation, balancing means responsive to the operative energization of said devices for producing a balancing signal of a value in proportion to the number of said devices then operatively energized, and adjusting means responsive to the difference between said deviation and balancing signals for varying the value of said reference signal to maintain balance between said deviation and balancing signals, thereby to maintain the number of operatively energized ones of said devices in proportion to the extent of said deviation.

23. Apparatus as specified in claim 22, wherein said adjusting means progressively increases the value of said reference signal when said deviation signal exceeds said balancing signal, and progressively decreases the value of said reference signal when said balancing signal exceeds said deviation signal, and wherein there are included antihunting means connected to said adjusting means and including time delay means for preventing said adjusting means from decreasing the value of said reference signal for a predetermined time period following an increase in the value of said reference signal which results in a substantially simultaneous overbalancing increase in said balancing signal.

24. Apparatus as specified in claim 19, wherein said third means includes a bridge circuit having input terminals adapted to be connected to a source of bridge energization, having output terminals, and having bridge arms interconnecting said terminals and including impedance elements, means connected between said output terminals and arranged to vary the value of said reference signal progressively in the absence of balance of said bridge circuit, means adapted to vary the impedance in one of said bridge arms in accordance with the extent of said deviation, thereby to unbalance said bridge circuit, and means responsive to the operative energization of said devices for varying the impedance in another one of said bridge arms, as said devices become operatively energized and deenergized, in a direction tending to balance said bridge circuit, thereby to maintain the number of operatively energized ones of said devices in proportion to the extent of said deviation.

25. Apparatus as specified in claim 24, wherein said another one of said bridge arms includes a plurality of parallel connected circuit paths, each of which is individual to a corresponding one of said plants and includes a resistor and a pair of normally-open contacts in series, wherein each of said pairs of contacts is arranged to be closed by the corresponding one of said devices when the latter is operatively energized, and wherein a fixed resistor is connected in one of said bridge arms which is adjacent to said another bridge arm.

26. Apparatus as specified in claim 24, wherein said another one of said bridge arms includes a plurality of parallel-connected circuit paths, each of which is individual to a corresponding one of said plants and includes a resistor and a pair of normally-open contacts in series, wherein one of said bridge arms which is adjacent to said another bridge arm includes a plurality of parallel-connected circuit paths, each of which is individual to a corresponding one of said plants and includes a resistor and a pair of normally-closed contacts in series, and wherein the pair of said normally-open contacts and the pair of said normally-closed contacts for each plant are arranged to be closed and opened, respectively, by the corresponding one of said devices when the latter is operatively energized.

27. Apparatus as specified in claim 19, wherein each of said devices is a differential electromagnetic relay having a first operating winding connected to said reference conductor and energized therefrom by said reference signal, and having a second operating winding adapted to be energized by the corresponding one of said cost signals.

28. Apparatus for assigning the loads to the interconnected generating plants of a power system as required to cause the scheduled requirements of the system to be met in the most economical manner, comprising a separate generation raising, signal responsive device and a separate generation lowering, signal responsive device individual to each of said plants, a raising reference conductor adapted to have a raising reference signal thereon, a lowering reference conductor adapted to have a lowering reference signal thereon, first means connecting said raising reference conductor to each of said raising devices for applying said raising reference signal thereto, second means connecting said lowering reference conductor to each of said lowering devices for applying said lowering reference signal thereto, third means adapted to apply to each of said devices a cost signal of a value representative of the relative incremental delivered energy cost for the corresponding one of said plants, each of said devices being arranged to be operatively energized when the values of the corresponding ones of said reference and cost signals applied thereto attain a predetermined relationship, fourth means responsive to the extent of deviation between the existing and scheduled values of the system conditions, including first adjusting means for varying the value of said raising reference signal to maintain the number of operatively energized ones of said raising devices in proportion to the extent of said deviation when the latter is of a negative sense requiring for its reduction an increase in the system generation, and including second adjusting means for varying the value of said lowering reference signal to maintain the number of operatively energized ones of said lowering devices in proportion to the extent of said deviation when the latter is of a positive sense requiring for its reduction a decrease in the system generation, whereby, when said deviation has said negative sense, said raising devices are operatively energized and deenergized in the ascending and descending orders, respectively, of their corresponding plant costs as the value of said raising reference signal is changed in one direction or the other, respectively, and whereby, when said deviation has said positive sense, said lowering devices are operatively energized and deenergized in the descending and ascending orders, respectively, of their corresponding plant costs as the value of said lowering reference signal is changed in one direction or the other, respectively, and fifth means for assigning a plant generation raising control effect to each plant having the corresponding one of said raising devices operatively energized, and for assigning a plant generation lowering control effect to each plant having the corresponding one of said lowering devices operatively energized, whereby the loads are assigned to said plants as required to meet the scheduled system requirements in the most economical manner.

29. Apparatus as specified in claim 28, wherein there are included means for disconnecting the one of said raising devices for a plant whose output has reached a predetermined maximum value, thereby to prevent positively the operative energization of such a device, and means for disconnecting the one of said lowering devices for a plant whose output has reached a predetermined minimum value, thereby to prevent positively the operative energization of such a device.

30. Apparatus for assigning control impulses to the interconnected generating plants of a power system in accordance with the incremental delivered energy costs for the plants upon the departure of the system conditions from scheduled values therefor, comprising conductors adapted to be connected to a source of energizing voltage, a separate cost resistor individual to each of said plants and having an adjustable cost contact, means adapted to position each of said cost contacts along the corresponding one of said cost resistors in accordance with the relative incremental delivered energy cost for the corresponding one of said plants, a reference resistor having an adjustable reference contact, means connecting said resistors in parallel to said conductors to produce on said cost contacts cost signals having relative values which are proportional to said relative incremental delivered energy costs, and to produce on said reference contact a reference signal having a value which is dependent upon the position of said reference contact along said reference resistor, a separate relay individual to each of said plants and having a pair of normally-open balancing contacts, a pair of normally-open impulse assigning contacts, and an operating winding, means connecting said winding between said reference contact and the corresponding one of said cost contacts, whereby said relay contacts are progressively closed in the order of said costs for the corresponding plants as said reference contact is moved progressively along said reference resistor in one direction, and are progressively opened in the reverse order of said costs as said reference contact is moved progressively in the opposite direction, a deviation resistor having an adjustable deviation contact, means adapted to position the latter along said deviation resistor in accordance with the extent of deviation between the existing and scheduled values of the system conditions, means connecting said deviation resistor to said conductors to produce on said deviation contact a deviation signal having a value which is proportional to the extent of said deviation, a balancing conductor, means connecting each of said pairs of balancing contacts in series with a corresponding one of a plurality of balancing resistors between said balancing conductor and one of the first mentioned conductors, means connecting a common resistor between said balancing conductor and another of said first mentioned conductors, whereby there is produced on said balancing conductor a balancing signal of a value which is proportional to the number of closed pairs of said balancing contacts, means connected between said deviation contact and said balancing conductor and responsive to the difference between said deviation and balancing signals for effecting said progressive movement of said reference contact in said one direction when said deviation signal exceeds said balancing signal, and for effecting said progressive movement of said reference contact in said opposite direction when said balancing signal exceeds said deviation signal, whereby the number of closed pairs of said impulse assigning contacts is maintained proportional to the extent of said deviation, and means adapted upon the closure of a pair of said impulse assigning contacts to assign to the corresponding one of said plants a series of control impulses of a sense to reduce said deviation.

31. Apparatus for assigning control impulses to the interconnected generating plants of a power system in accordance with the incremental delivered energy costs for the plants upon the departure of the system conditions from scheduled values therefor, comprising conductors adapted to be connected to a source of energizing voltage, a reference resistor having an adjustable reference contact, resistance means having an intermediate junction, means connecting said resistance means and said resistor in parallel to said conductors to produce between said reference contact and said junction a reference signal having a value which is dependent upon the position of said reference contact along said reference resistor, a separate relay individual to each of said plants and having a reference operating winding and a group of contacts including a pair of normally-open balancing contacts, a pair of normally-closed balancing contacts, and a pair of normally-open impulse assigning contacts, means connecting each of said windings in parallel between said reference contact and said junction, each of said relays except the one individual to a predetermined one of said plants also having a cost operating winding, means adapted to supply to each of said cost windings a cost signal individual to the corresponding one of said plants, the relative values of said cost signals being dependent upon the relative incremental delivered energy costs for the corresponding plants relative to the incremental delivered energy cost for said predetermined one of said plants, whereby said groups of said contacts are progressively actuated out of their normal conditions in the order of said costs for the corresponding plants as said reference contact is moved progressively along said reference resistor in one direction, and are progressively actuated into their normal conditions in the reverse order of said costs as said reference contact is moved progressively in the opposite direction, a deviation resistor having an adjustable deviation contact, means adapted to position the latter along said deviation resistor in accordance with the extent of deviation between the existing and scheduled values of the system conditions, means connecting said deviation resistor to said conductors to produce on said deviation contact a deviation signal having a value which is proportional to the extent of said deviation, a balancing conductor, means connecting each of said pairs of normally-open balancing contacts in series with a corresponding one of a first plurality of balancing resistors between said balancing conductor and one of the first mentioned conductors, means connecting each of said pairs of normally-closed balancing contacts in series with a corresponding one of a second plurality of balancing resistors between said balancing conductor and another of said first mentioned conductors, whereby there is produced on said balancing conductor a balancing signal of a value which is proportional to the number of closed pairs of said impulse assigning contacts, means connected between said deviation contact and said balancing conductor and responsive to the difference between said deviation and balancing signals for effecting said progressive movement of said reference contact in said one direction when said deviation signal exceeds said balancing signal, and for effecting said progressive movement of said reference contact in said opposite direction when said balancing signal exceeds said deviation signal, whereby the number of closed pairs of said impulse assigning contacts is maintained proportional to the extent of said deviation, and means adapted upon the closure of a pair of said impulse assigning contacts to assign to the corresponding one of said plants a series of control impulses of a sense to reduce said deviation.

32. Apparatus for simultaneously controlling the outputs of one or more of the interconnected generating plants of a power system as required to correct for deviation from the scheduled requirements of the system in a rapid but stable manner, comprising means responsive to deviation between the existing and scheduled values of the system conditions for selecting one or more of said plants, said means including means arranged to make the number of plants so selected a function of the extent of said deviation, and other means responsive to the selection effected by the first mentioned means for simultaneously changing the output of each of only the selected ones of said plants in the direction to reduce said deviation, thereby to correct said deviation in a rapid but stable manner.

33. Apparatus as specified in claim 10, wherein one of said system conditions is the load on a tie line associated with said system, and wherein there are included means responsive to the value of said load, and means responsive to the last mentioned means for positively preventing the operative energization of one or more of said first devices when such energization causes said load to exceed a predetermined maximum value.

No references cited.